United States Patent (10) Patent No.: US 9,257,703 B2
Sekine (45) Date of Patent: Feb. 9, 2016

(54) ELECTRODE BINDER COMPOSITION FOR NONAQUEOUS ELECTROLYTE BATTERY, ELECTRODE FOR NONAQUEOUS ELECTROLYTE BATTERY, AND NONAQUEOUS ELECTROLYTE BATTERY

(75) Inventor: Toshiyuki Sekine, Tokyo (JP)

(73) Assignee: ZEON CORPORATION, Tokyo (JP)

(*) Notice: Subject to any disclaimer, the term of this patent is extended or adjusted under 35 U.S.C. 154(b) by 129 days.

(21) Appl. No.: 13/976,338

(22) PCT Filed: Dec. 27, 2011

(86) PCT No.: PCT/JP2011/080192
§ 371 (c)(1),
(2), (4) Date: Jun. 26, 2013

(87) PCT Pub. No.: WO2012/091001
PCT Pub. Date: Jul. 5, 2012

(65) Prior Publication Data
US 2013/0280606 A1  Oct. 24, 2013

(30) Foreign Application Priority Data
Dec. 28, 2010  (JP) ................. 2010-293790

(51) Int. Cl.
*H01M 4/62* (2006.01)
*C08F 220/42* (2006.01)
*H01M 10/052* (2010.01)
*C09D 5/24* (2006.01)
*C08F 2/20* (2006.01)
*C08F 220/18* (2006.01)
*C08F 220/44* (2006.01)
*C08F 236/12* (2006.01)
*C08L 33/06* (2006.01)
*C08L 9/02* (2006.01)
*H01M 4/13* (2010.01)
*C08K 3/04* (2006.01)

(52) U.S. Cl.
CPC ............... *H01M 4/622* (2013.01); *C08F 2/20* (2013.01); *C08F 220/18* (2013.01); *C08F 220/42* (2013.01); *C08F 220/44* (2013.01); *C08F 236/12* (2013.01); *C08L 9/02* (2013.01); *C08L 33/064* (2013.01); *C09D 5/24* (2013.01); *H01M 10/052* (2013.01); *C08K 3/04* (2013.01); *H01M 4/13* (2013.01); *Y02E 60/122* (2013.01)

(58) Field of Classification Search
None
See application file for complete search history.

(56) References Cited

U.S. PATENT DOCUMENTS 8,043,747 B2    10/2011  Suzuki et al.
2008/0032192 A1* 2/2008  Yokomizo et al. ............ 429/210
2011/0003207 A1  1/2011  Oh et al.

FOREIGN PATENT DOCUMENTS

| EP | 1780224 A1 | 5/2007 |
|---|---|---|
| JP | 2001-279158 A | 10/2001 |
| JP | 2003-282061 A | 10/2003 |
| JP | 2003-317721 A | 11/2003 |
| JP | 2007-67088 A | 3/2007 |
| JP | 2008-270142 A | 11/2008 |
| JP | 2010-92719 A | 4/2010 |
| JP | 2011-134492 A | 7/2011 |
| WO | WO 2006/033173 A1 | 3/2006 |
| WO | WO 2009/128589 A1 | 10/2009 |

OTHER PUBLICATIONS

PCT/ISA/210—International Search Report mailed on Apr. 17, 2012, issued in PCT/JP2011/080192.
PCT/ISA/237—mailed on Apr. 17, 2012, issued in PCT/JP2011/080192.
Extended European Search Report dated Mar. 11, 2015, issued in corresponding European Application No. 11852368.7.

* cited by examiner

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

Provided is a binder composition for electrodes that has high stability in the form of a liquid composition dissolved or dispersed in a solvent and can improve cycle property of a non-aqueous electrolyte battery. The binder composition used is a binder composition including a polymer A containing 80% by weight or more and 99.9% by weight or less of a repeating unit derived from a monomer including a nitrile group and 0.1% by weight or more and 20% by weight or less of a repeating unit derived from an ethylenically unsaturated compound, wherein a weight-average molecular weight of the polymer A is 500,000 to 2,000,000, and a molecular weight distribution (Mw/Mn) of the polymer A is 13 or smaller.

9 Claims, No Drawings

ELECTRODE BINDER COMPOSITION FOR NONAQUEOUS ELECTROLYTE BATTERY, ELECTRODE FOR NONAQUEOUS ELECTROLYTE BATTERY, AND NONAQUEOUS ELECTROLYTE BATTERY

FIELD

The present invention relates to a binder composition for electrodes of a non-aqueous electrolyte battery, to an electrode for a non-aqueous electrolyte battery, and to a non-aqueous electrolyte battery.

BACKGROUND

Generally, non-aqueous electrolyte batteries such as lithium ion secondary batteries has tendency to lose their electric capacity as a result of repetition of charging and discharging. The property of the battery in such decrease in the electric capacity after the repetition of charging/discharging are referred to as "cycle property". Usually, when the electric capacity is less prone to decrease even after the repetition of charging/discharging, such property is referred to as "high cycle property". When the electric capacity is prone to decrease after the repetition of charging/discharging, such property is referred to as "low cycle property".

Conventionally, a variety of techniques have been proposed for the purpose of improving the cycle property. For example, Patent Literatures 1 to 3 propose techniques for improving cycle property by using specific compositions as the binder compositions for electrodes.

CITATION LIST

Patent Literature 1: Japanese Patent Application Laid-Open No. 2010-092719 A
Patent Literature 2: International Publication No. 2006/033173
Patent Literature 3: Japanese Patent Application Laid-Open No. 2003-282061 A

SUMMARY

Technical Problem

In recent years, there is an increasing demand for improving the performance of non-aqueous electrolyte batteries. As to cycle property, there is also a demand for developing a technique superior to the techniques described in Patent Literatures 1 to 3.

The present inventor has conducted studies and found out that the polymers used in the binder compositions described in Patent Literatures 1 to 3 have low molecular weights. Therefore, the inventor has conducted further studies on the basis of the assumption that use of a polymer having a high molecular weight in a binder composition to increase the strength of the binder composition would result in suppression of deterioration caused by the expansion, contraction, deformation, etc. of the electrodes due to charging and discharging, to thereby improve the cycle property. However, it has been found out that, with the techniques described in Patent Literatures 1 to 3, it is difficult to increase the molecular weight of the polymer, so that further improvement in cycle property is difficult.

Generally, a binder composition for electrodes is prepared as a liquid composition containing the binder composition dissolved or dispersed in a solvent such as water (the liquid composition is appropriately referred to hereinbelow as a "binder solution"). The binder solution is usually mixed with an electrode active material, etc. to form an electrode slurry, and is applied onto the surface of a current collector, to thereby produce an electrode. However, the aforementioned binder solution and electrode slurry are not used immediately after preparation but are usually stored and conveyed in the state of the binder solution and electrode slurry. Therefore, the binder solution and the electrode slurry are required to have stability, and it is desirable to avoid precipitation of the electrode active material in the electrode slurry and to avoid gelation of the polymer in the binder solution. However, it has been found out that even when an attempt is made to increase the molecular weight of the polymer in the techniques described in Patent Literatures 1 to 3, it is difficult to obtain a binder solution and an electrode slurry having high stability.

The present invention has been created in view of the foregoing problem. It is an object of the present invention to provide a binder composition for electrodes that has high stability in the form of a liquid composition dissolved or dispersed in a solvent and can improve cycle property of a non-aqueous electrolyte battery, to provide an electrode for a non-aqueous electrolyte battery using the binder composition, and to provide a non-aqueous electrolyte battery using the binder composition.

Solution to Problem

The present inventor has conducted extensive studies to solve the foregoing problem. As a result of the studies, the inventor has found out that, when a polymer having a repeating unit derived from a monomer containing a nitrile group and a repeating unit derived from an ethylenically unsaturated compound is polymerized by a specific polymerization method, a polymer can having a narrow molecular weight distribution and a high molecular weight can be obtained. The inventor has also found out that, when a binder composition for electrodes of a non-aqueous electrolyte battery contains the polymer that has obtained in this manner, the resulting binder composition becomes highly stable in the form of a liquid composition dissolved or dispersed in a solvent, and the cycle property of the non-aqueous electrolyte battery can be improved. The present invention has been completed on the basis of the aforementioned findings.

That is, according to the present invention, the following (1) to (6) are provided.

(1) A binder composition for an electrode of a non-aqueous electrolyte battery, the binder comprising a polymer A containing 80% by weight or more and 99.9% by weight or less of a repeating unit derived from a monomer including a nitrile group and 0.1% by weight or more and 20% by weight or less of a repeating unit derived from an ethylenically unsaturated compound, wherein a weight-average molecular weight of the polymer A is 500,000 to 2,000,000, and a molecular weight distribution (Mw/Mn) of the polymer A is 13 or smaller.

(2) The binder composition for an electrode of a non-aqueous electrolyte battery according to (1), further comprising a polymer B containing 10% by weight or more and 40% by weight or less of a repeating unit derived from acrylonitrile or methacrylonitrile, wherein the polymer B has an iodine number of 50 g/100 g or lower.

(3) The binder composition for an electrode of a non-aqueous electrolyte battery according to (2), wherein a weight ratio of the polymer A to the polymer B (the polymer A/the polymer B) is 3/7 or higher and 7/3 or lower.

(4) An electrode for a non-aqueous electrolyte battery, comprising a current collector and an electrode material layer provided on at least one side of the current collector, wherein the electrode material layer contains an electrode active material and the binder composition for an electrode according to any one of (1) to (3), and a solid content of the binder composition for the electrode with respect to 100 parts by weight of the electrode active material is 0.3 parts by weight or more and 5 parts by weight or less.

(5) A non-aqueous electrolyte battery comprising the electrode for a non-aqueous electrolyte battery according to (4).

(6) The non-aqueous electrolyte battery according to (5), wherein the non-aqueous electrolyte battery is a lithium ion secondary battery.

Advantageous Effects of Invention

According to the present invention, a binder composition for electrodes can be realized which has high stability in the form of a liquid composition dissolved or dispersed in a solvent and can improve the cycle property of a non-aqueous electrolyte battery. In addition, electrodes for a non-aqueous electrolyte battery using the binder composition and a non-aqueous electrolyte battery using the binder composition can be realized.

DESCRIPTION OF EMBODIMENTS

The present invention will be described hereinbelow in detail by way of embodiments and exemplifications. However, the present invention is not limited to the following embodiments and exemplifications, and may be implemented with arbitrary modifications within the scope of the claims and equivalents thereto. In the following description, the sign "A" in polymer A and the sign "B" in polymer B are signs for distinguishing the elements with these signs from other elements and do not have any meaning other than the distinction between these elements. In addition, (meth)acrylic acid means acrylic acid and methacrylic acid, and (meth)acrylate means acrylate and methacrylate.

[1. Binder Composition for Electrodes of Non-Aqueous Electrolyte Battery]

The binder composition for electrodes of a non-aqueous electrolyte battery of the present invention (appropriately referred to hereinbelow as a "battery of the present invention") (the binder composition is appropriately referred to as a "binder composition of the present invention") is a composition containing a polymer A. Preferably, the binder composition of the present invention further contains a polymer B. The binder composition of the present invention functions as a binder in electrodes of a non-aqueous electrolyte battery.

[1-1. Polymer A]

The polymer A contains a repeating unit derived from a monomer including a nitrile group (appropriately referred to hereinbelow as a "nitrile group-containing monomer") (this repeating unit is appropriately referred hereinbelow to as a "nitrile group-containing monomer unit") and a repeating unit derived from an ethylenically unsaturated compound (appropriately referred to hereinbelow as an "ethylenically unsaturated compound unit").

The nitrile group-containing monomer for use is usually a compound having a nitrile group (—CN group) and capable of forming a polymer through polymerization. Particularly, an α,β unsaturated nitrile compound is preferred as the nitrile group-containing monomer. Specific examples thereof may include acrylonitrile and methacrylonitrile. From the viewpoint of the balance of ease of polymerization reaction, cost performance, flexibility and foldability of an electrode having an electrode material layer formed thereon, resistance to swelling in an electrolyte solution, etc., acrylonitrile is preferred. As the nitrile group-containing monomer, one species thereof may be solely used, or a combination of two or more species thereof may be used at any ratio. The polymer A may contain only one species of nitrile group-containing monomer unit or may contain two or more species thereof at any ratio.

The amount of the nitrile group-containing monomer unit in the polymer A is usually 80% by weight or more, preferably 90% by weight or more, and more preferably 94% by weight or more and is usually 99.9% by weight or less and preferably 99% by weight or less. When the amount of the nitrile group-containing monomer unit is within the aforementioned range, the adhesive strength (peel strength) of an electrode material layer to a current collector can be increased. When the amount of the nitrile group-containing monomer unit is equal to or lower than the upper limit value of the aforementioned range, the resistance of the polymer A to an electrolyte solution can be improved. This can prevent gradual deterioration of binding properties caused by, e.g., dissolution of the binder composition in the electrolyte solution or swelling of the binder composition with the electrolyte solution, so that an electrode active material can be stably prevented from being peeled from the current collector.

As the ethylenically unsaturated compound in the present invention, a compound having no nitrile group, having an unsaturated hydrocarbon chain including a carbon-carbon double bond, and polymerizable with the nitrile group-containing monomer is usually used. Examples of such a compound may include: halogenated vinyls and halogenated vinylidenes such as vinyl chloride, vinyl bromide, vinyl fluoride, and vinylidene chloride; unsaturated carboxylic acids such as acrylic acid, methacrylic acid, maleic acid, and itaconic acid and salts thereof; acrylate esters such as methyl acrylate, ethyl acrylate, butyl acrylate, octyl acrylate, methoxyethyl acrylate, phenyl acrylate, and cyclohexyl acrylate; methacrylate esters such as methyl methacrylate, ethyl methacrylate, butyl methacrylate, octyl methacrylate, methoxyethyl methacrylate, phenyl methacrylate, and cyclohexyl methacrylate; unsaturated ketones such as methyl vinyl ketone, methyl phenyl ketone, and methyl isopropenyl ketone; vinyl esters such as vinyl formate, vinyl acetate, vinyl propionate, vinyl butyrate, and vinyl benzoate; vinyl ethers such as methyl vinyl ether and ethyl vinyl ether; acrylic acid amide and alkyl substitution products thereof; unsaturated sulfonic acids such as vinyl sulfonic acid, allyl sulfonic acid, methallyl sulfonic acid, p-styrene sulfonic acid, and salts thereof; styrene and alkyl and halogen substitution products thereof such as styrene, α-methylstyrene, and chlorostyrene; allyl alcohol and esters and ethers thereof; basic vinyl compounds such as vinylpyridine, vinylimidazole, and dimethylaminoethyl methacrylate; and vinyl compounds such as acrolein, methacrolein, and glycidyl methacrylate.

Of these, unsaturated compounds having a carboxyl group (—COOH group) are preferred as the ethylenically unsaturated compound. The use of an unsaturated compound having a carboxyl group can increase peel strength to stably improve the cycle property of the battery. Of these, particularly, unsaturated carboxylic acids are more preferred, and acrylic acid and methacrylic acid are particularly preferred.

As the ethylenically unsaturated compound, one species thereof may be solely used, or a combination of two or more species thereof may be used at any ratio.

The amount of the ethylenically unsaturated compound in the polymer A is usually 0.1% by weight or more and preferably 1% by weight or more and is usually 20% by weight or less, preferably 15% by weight or less, more preferably 10% by weight or less, still more preferably 8% by weight or less, and particularly preferably 6% by weight or less. When the amount of the ethylenically unsaturated compound in the polymer A is equal to or larger than the lower limit value of the aforementioned range, an electrode material layer can be stably formed. When the amount is equal to or lower than the upper limit value of the aforementiohed range, an increase in the viscosity of an electrode slurry can be suppressed, so that the electrode material layer can be easily produced.

The polymer A in the present invention may contain a repeating unit other than the nitrile group-containing monomer unit and the ethylenically unsaturated compound unit, so long as the effects of the present invention are not significantly impaired. The polymer A may contain only one species of such a repeating unit, or a combination of two or more species thereof at any ratio.

The weight-average molecular weight Mw of the polymer A is usually 500,000 or higher and preferably 750,000 or higher and is usually 2,000,000 or lower and preferably 1,500,000 or lower.

The molecular weight distribution (Mw/Mn) of the polymer A is usually 13 or lower and preferably 10 or lower and is usually 3 or higher. Mn herein represents a number-average molecular weight.

The weight-average molecular weight Mw and the number-average molecular weight Mn may be measured by gel permeation chromatography (GPC). More specifically, a polar solvent such as N,N-dimethylformamide (DMF) and N-methylpyrrolidone (NMP) is used as the eluent for GPC, and the measurement is performed using a column for a polar polymer at a temperature of 30° C. to 40° C. The molecular weight is determined as a standard polystyrene equivalent value.

As described above, the binder composition of the present invention has a high weight-average molecular weight Mw and a narrow molecular weight distribution (i.e., has a uniform molecular weight). Since the binder composition has these features, the stability of an electrode slurry containing the binder composition of the present invention can be improved, and the cycle property of the non-aqueous electrolyte battery can be improved.

The weight-average molecular weight Mw of a conventional polymer such as those described in any of Patent Literatures 1 to 3 that contains a nitrile group and is synthesized from, e.g., acrylonitrile is usually about 20,000 to about 300,000. Such a polymer is industrially produced by, e.g., an aqueous polymerization method in which the monomers are polymerized in an aqueous medium using a water-soluble polymerization initiator (appropriately referred to hereinbelow as a "water-soluble initiator") or a solution polymerization method in which the polymerization is performed in an inorganic or organic solvent that can dissolve the polymer.

In an experimental scale, attempts have been made to produce such a polymer by, e.g., a bulk polymerization method in which the monomers and a polymerization initiator soluble in the monomers are mixed and heated or a photo solution polymerization method in which the monomers are irradiated with ultraviolet rays in an inorganic or organic solvent capable of dissolving the monomers and the polymer obtained by polymerization of the monomers. However, in the bulk polymerization method, viscosity significantly increases as the polymerization reaction proceeds, so that the internal temperature of the reaction system becomes nonuniform because of heating. Therefore, the polymerization operation and process management for controlling the polymerization reaction are complicated, and the properties of the polymer tend to become nonuniform. The photo solution polymerization method requires high production cost, and has a variety of problems such as a large size of the apparatus, removal of impurities in the polymer solution, and an increase in the viscosity of the solution due to an increase in the molecular weight. Therefore, no method other than the aforementioned aqueous polymerization method and solution polymerization method has been practically used as industrial means.

As another conceivable method, suspension polymerization may be performed in an aqueous medium using a water-soluble initiator and a dispersion stabilizer to obtain a high-molecular weight polymer. However, when, e.g., acrylonitrile is used as a monomer, about 7% of the monomer dissolves in water at an ordinary polymerization temperature. Therefore, as the polymerization reaction proceeds, the polymerization reaction of acrylonitrile dissolved in the aqueous phase is also initiated and proceeds, in addition to the suspension polymerization that occurs in oil droplets insoluble in water. The polymer formed in the aqueous phase has a lower molecular weight than that of the polymer formed in the oil droplets, and the diameter of the polymer particles generated tends to be small. Therefore, even in the suspension polymerization, a mixture of two types of polymers formed in the oil droplets and the aqueous phase is obtained. Accordingly, the suspension polymerization product inevitably contains the low-molecular weight polymer polymerized in the aqueous phase, so that it is difficult to produce a high-molecular weight polymer having a sharply uniform molecular weight distribution and a uniform particle size.

Because of the aforementioned circumstances, with the conventional techniques described in Patent Literatures 1 to 3, it is difficult to industrially produce a high-molecular weight polymer having a nitrile group, and it is also difficult to suppress the formation of the low-molecular weight polymer. Therefore, as the molecular weight increases, the peak of the molecular weight distribution is inevitably widened, or a plurality of peaks appear, so that the molecular weight distribution inevitably becomes significantly broad.

However, in the present invention, the polymer A having a high molecular weight and sharply uniform molecular weight distribution is achieved. By increasing the molecular weight, the mechanical strength of the polymer A can be increased. This can suppress breakage of the electrode material layer caused by charging and discharging, so that the cycle property of the non-aqueous electrolyte battery to which the polymer A is applied can be improved. In addition, by increasing the molecular weight, the resistance to an electrolyte solution can be increased, so that breakage and peeling of the electrode material layer due to swelling can be suppressed. This also contributes to improvement of the cycle property. However, if the molecular weight of the polymer A is excessively increased, its solubility in a solvent becomes poor to hamper preparation of the electrode slurry. The polymer A having excessively high molecular weight may also excessively elevate hardness of the electrode material layer, to deteriorate workability. The polymer A having excessively high molecular weight may also increase tendency to cause exfoliation of the electrode material layer from the current collector, so that peel strength may decrease. Therefore, the aforementioned upper limit is set for the weight-average molecular weight Mw of the polymer A.

By narrowing the molecular weight distribution of the polymer A, it is possible to stably realize uniform composition of the electrode material layer. Therefore, it is possible to avoid occurrence of partially formed weak portions in the electrode material layer, whereby breakage and peeling of the electrode material layer during production or due to stress generated during charging and discharging can be prevented, so that the cycle property can be improved. In addition, by the uniform composition of the electrode material layer, it is expected that the electrode material layer can have a smooth surface.

When the molecular weight distribution of the polymer A is narrow, the amount of the low-molecular weight component contained in the polymer A becomes small. Therefore, when an electrode slurry is prepared therewith, the formation of a gel due to dissolution of the low-molecular weight component into a solvent can be suppressed, and precipitation and deposition of an electrode active material contained in the electrode slurry due to such dissolution of the low-molecular weight component can be suppressed. Therefore, the stability of the electrode slurry can be improved.

The polymer A having a high weight-average molecular weight Mw and a narrow molecular weight distribution may be produced by, e.g., the suspension polymerization method in which the polymerization reaction is performed in oil droplets while the polymerization reaction in the aqueous phase is suppressed. Such a polymer A having a high weight-average molecular weight Mw and a narrow molecular weight distribution is obtainable by collecting substantially only polymers that has generated in the oil droplets while constantly keeping the concentration of the nitrile group-containing monomer present in the polymerization system is equal to or higher than its solubility limit in the aqueous phase.

More specifically, the suspension polymerization in which the polymerization reaction is initiated and proceeds in the oil droplets dispersed in the aqueous phase may be performed with the presence of a dispersant and an oil-soluble polymerization initiator (appropriately referred to hereinbelow as an "oil-soluble initiator") in the polymerization system. In this case, a solvent other than the monomers may be used for forming the oil droplets. However, from the viewpoint of increasing the concentration of the monomers in the oil droplets, it is usually preferable to form the oil droplets from the monomers. In the monomers that are used for producing the polymer A, the nitrile group-containing monomer accounts for particularly large amount. Therefore, formation of the oil droplets is usually performed with the nitrile group-containing monomer.

The monomers for use may be the aforementioned nitrile group-containing monomer and, if necessary, the ethylenically unsaturated compound and another optional monomer. In this case, the higher the concentration of the monomers in the polymerization system, the more preferred because polymer A having a high molecular weight can be easily obtained. More specifically, the compositional weight ratio of the monomers relative to water in the polymerization system (monomers/water) is preferably higher than 1/6 and more preferably 1/5 or higher. When the compositional weight ratio of the monomers relative to water is higher than 1/6, the polymer A can be produced at high productivity. This is because, since the state of constant presence of the monomers in the polymerization system in a sufficient amount (for example, 9% by weight or more) is thereby maintained, the reaction is not terminated at a low polymerization conversion ratio.

To secure constant presence of the monomers in the polymerization system in a sufficient amount means that unreacted monomers are constantly present in a sufficient amount with respect to the total amount of the monomers and water present in the polymerization system. The conditions for maintaining such a state are the conditions that the nitrile group-containing monomer is dissolved or dispersed in the aqueous phase of the polymerization system constantly in a supersaturated state. If the monomers are not present in a sufficient amount, the monomers dissolved in the aqueous phase may be polymerized, and a low-molecular weight polymer may be formed.

The method for maintaining the aforementioned state of the polymerization system with the constant presence of the sufficient amount of monomers may be as follows. For example, in batch polymerization, the polymerization time after the initiation of polymerization and the progress of the polymerization conversion rate are measured, and the reaction is terminated in a state in which a sufficient amount of the monomers remains in the polymerization system. For example, in continuous polymerization, the continuous polymerization is performed while the monomers and water are supplied to a polymerization vessel at the aforementioned compositional ratio and the generated polymer A is continuously collected with a sufficient amount of the monomer remaining in the polymerization system.

The dispersant usually functions as a dispersion stabilizer that improves the dispersibility of the oil droplets when the monomers are subjected to suspension polymerization using water as a medium. Usually, the dispersant also has a function of preventing adhesion of the polymer to the inner wall of a reaction vessel or stirring blades, which often causes a problem in the suspension polymerization using an oil-soluble initiator. In addition, the dispersant usually has a function of preventing coagulation of polymer particles caused by coalescence of the polymer particles that has been generated by polymerization. Preferably, the dispersant is capable of being easily removed by subjecting the obtained polymer to a washing treatment.

As such a dispersant, e.g., a water-soluble polymer compound is used. Being water-soluble means that, when 0.5 g of the compound is dissolved in 100 g of water at 25° C., the undissolved amount is less than 0.5% by weight. Being oil-soluble means that, when 0.5 g of a compound is dissolved in 100 g of water at 25° C., the undissolved amount is 90% by weight or more.

Examples of the water-soluble polymer compound may include: water-soluble celluloses such as methylcellulose, ethyl cellulose, carboxymethyl cellulose, and hydroxyethyl cellulose; polyvinylpyrrolidone; polyacrylamide; polyethylene oxide; polyacrylic acid and salts thereof; polymethacrylic acid and salts thereof; polymers of sulfonic acid-containing monomers such as styrene sulfonic acid and sulfopropyl methacrylate and salts thereof; water-soluble copolymers of a sulfonic acid or carboxylic acid-containing monomer and salts thereof; and polyvinyl alcohols (appropriately referred to hereinbelow as "PVA"). Of these, polyvinyl alcohols are preferred. Among the polyvinyl alcohols, a partially saponified polyvinyl alcohol having a degree of saponification of 85% to 95% is used, particularly preferred polymerization results are obtained.

As the dispersant, one species thereof may be solely used, or a combination of two or more species thereof may be used at any ratio.

The using amount of the dispersant may be arbitrarily determined so long as the polymer A having the desired weight-average molecular weight Mw and the desired molecular weight distribution Mw/Mn is obtained. However, from the viewpoint of obtaining preferable polymerization results, the amount of the dispersant is preferably 0.05% by weight or more and more preferably 0.1% by weight or more, and is preferably 2% by weight or less on the basis of the total weight of the monomers.

As the polymerization initiator for the polymer A in the present invention, an oil-soluble radical initiator is usually used to initiate the reaction. Examples of the oil-soluble radical initiator may include azo-based compounds and organic peroxides.

Examples of the azo-based compounds may include 2,2'-azobisisobutyronitrile (appropriately referred to hereinbelow as "AIBN"), 2,2'-azobis(2-methyl-butyronitrile), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), 2,2'-azobis(4-methoxy-2,4-dimethylvaleronitrile), 2,2'-azobis[N-(2-propenyl)-2-methylpropionamide], 2,2'-azobis(N-butyl-2-methylpropionamide), 2,2'-azobis(N-cyclohexyl-2-methylpropionamide), 1,1-azobis(1-acetoxy-1-phenylethane), 1,1'-azobis(cyclohexane-1-carbonitrile), dimethyl-2,2'-azobis(2-methylpropionate), dimethyl-2,2'-azobisisobutyrate, 2-(carbamoylazo)isobutyronitrile, and 4,4'-azobis(4-cyanovaleric acid).

Other examples of the azo-based polymerization initiator may include azo polymer-based polymerization initiators. Examples of the azo polymer-based polymerization initiators may include polydimethylsiloxane unit-containing azo polymer-based polymerization initiators and polyethylene glycol unit-containing azo polymer-based polymerization initiators. Specific examples of the polydimethylsiloxane unit-containing azo polymer-based polymerization initiators may include "VPS-0501" and "VPS-1001" manufactured by Wako Pure Chemical Industries, Ltd. Specific examples of the polyethylene glycol unit-containing azo polymer-based polymerization initiators may include "VPE-0201", "VPE-0401", and "VPE-0601" manufactured by Wako Pure Chemical Industries, Ltd.

Examples of the organic peroxides may include: diacyl peroxides such as acetyl peroxide, propionyl peroxide, isobutyl peroxide, octanoyl peroxide, decanoyl peroxide, lauroyl peroxide, 3,5,5-trimethylhexanoyl peroxide, benzoyl peroxide, diisopropyl peroxydicarbonate, and di-2-ethylhexyl peroxydicarbonate; and peroxyesters such as t-butyl peroxy isobutyrate, t-butyl peroxy pivalate, t-butyl peroxy neodecanoate, and t-butyl peroxy laurate.

Of these, azo compounds are preferred in terms of safety in handling (anti-shock stability) and performance. Of these, an azo compound having a 10 hour half-life period temperature of usually 30° C. or higher and preferably 50° C. or higher and usually 100° C. or lower and preferably 90° C. or lower is desirable. Specific examples of such an azo compound may include 2,2'-azobisisobutyronitrile (for example, "AIBN" manufactured by Tokyo Chemical Industry Co Ltd., 10 hour half-life period temperature: 65° C.), 2,2'-azobis(2-methyl-butyronitrile) (for example, "V-59" manufactured by Wako Pure Chemical Industries, Ltd., 10 hour half-life period temperature: 67° C.), 2,2'-azobis(2,4-dimethylvaleronitrile) (for example, "V-65" manufactured by Wako Pure Chemical Industries, Ltd., 10 hour half-life period temperature: 51° C.), 1,1-azobis(1-acetoxy-1-phenylethane) (for example, "OTAZO-15" manufactured by Otsuka Chemical Co., Ltd., 10 hour half-life period temperature: 61° C.), and dimethyl-2,2'-azobis(2-methylpropionate) (for example, "V-601" manufactured by Wako Pure Chemical Industries, Ltd., 10 hour half-life period temperature: 66° C.). These are preferable for the suspension dispersion polymerization using water having a boiling point of 100° C. as a dispersion medium. From the viewpoint of toxicity of decomposed products, 1,1-azobis(1-acetoxy-1-phenylethane) and dimethyl-2,2'-azobis(2-methylpropionate), which are non-nitrile-based initiators, are particularly preferred, also from the viewpoint of environmental sanitation.

As the oil-soluble initiator, one species thereof may be solely used, or a combination of two or more species thereof may be used at any ratio.

The using amount of the oil-soluble initiator varies depending on its performance (for example, 10 hour half-life period temperature) and polymerization conditions such as the concentrations and compositions of the monomers, polymerization temperature, and the degree of stirring, and therefore it is difficult to univocally define the amount. Usually, the using amount on the basis of 100 parts by weight of the total monomers may be as follows. In the case of using 2,2'-azobisisobutyronitrile, the using amount may be 0.1 parts to 2 parts. In the case of using 2,2'-azobis(2,4-dimethylvaleronitrile), the using amount may be 0.1 parts to 3 parts. In the case of using 1,1-azobis(1-acetoxy-1-phenylethane), the using amount may be 0.1 parts to 4 parts. In the case of using dimethyl-2,2'-azobis(2-methylpropionate), the using amount may be 0.1 parts to 3 parts. Particularly, in order to obtain the polymer A having a weight-average molecular weight Mw of 1,000,000 or higher, preferable using amount may be as follows. In the case of using 2,2'-azobisisobutyronitrile, the using amount may be 0.1 parts to 0.5 parts. In the case of using 2,2'-azobis(2,4-dimethylvaleronitrile), the using amount may be 0.15 parts to 0.8 parts. In the case of using 1,1-azobis(1-acetoxy-1-phenylethane), the using amount may be 0.1 parts to 1 part. In the case of using dimethyl-2,2'-azobis(2-methylpropionate), the using amount may be 0.1 parts to 0.8 parts.

When the polymer A is polymerized, the oil-soluble initiator is used for initiating the polymerization reaction. However, a water-soluble initiator may also be used within the range in which the weight-average molecular weight and distribution according to the present invention are not impaired. For example, in order to take measures against residual monomers, a water-soluble initiator may be allowed to be present in the latter half of the polymerization reaction to cause the polymerization reaction of the unreacted monomers to proceed.

Examples of the water-soluble initiator may include: persulfates such as ammonium persulfate, potassium persulfate, and sodium persulfate; water-soluble peroxides such as hydrogen peroxide; water-soluble azo compounds such as 2,2'-azobis(2-methylpropionamidine hydrochloride); and redox-type initiators obtained by combining oxidizing agents such as persulfates and reducing agents such as sodium hydrogen sulfite, ammonium hydrogen sulfite, sodium thiosulfate, and hydrosulfite. Of these, persulfates and water-soluble azo compounds are preferred from the viewpoint of, e.g., ease of polymerization reaction of the polymer. Among the persulfates, ammonium persulfate is particularly preferred from the viewpoint of, e.g., solubility in water and handling capability.

A chain transfer agent may be present in the polymerization system. The use of the chain transfer agent enables appropriate control of the polymerization reaction rate, so that non-uniform coagulation and coalescence of the polymer particles can be suppressed.

Examples of the chain transfer agent may include: alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide, diethyl xanthogen disulfide, and diisopropyl xanthogen disulfide; an α-methylstyrene dimer; terpinolene; thiuram-based compounds such as tetramethylthiuram disulfide, tetraethylthiuram disulfide, and tetramethylthiuram monosulfide; phenol-based compounds such as 2,6-di-t-butyl-4-methylphenol and styrenated phenol; allyl compounds such as allyl alcohol; halogenated hydrocarbon compounds such as dichloromethane, dibromomethane, carbon tetrachloride, and carbon tetrabromide; triphenylethane; pentaphenylethane; acrolein; methacrolein; thioglycolic acid; and 2-ethylhexyl thioglycolate. In terms of handling capability and cost performance, t-dodecyl mercaptan (TDM) and an α-methylstyrene dimer (α-MSD) are preferable as the chain transfer agent. As the chain transfer agent, one species thereof may be solely used, or a combination of two or more species thereof may be used at any ratio. When TDM is used, the amount thereof may be set to 0.4 parts by weight or less and preferably 0.25 parts by weight or less on the basis of 100 parts by weight of the monomers for use, since thereby the polymerization reaction rate can be controlled with no reduction in molecular weight and no coalescence and coagulation of the polymer particles.

The aforementioned components such as water, the monomers, the dispersant, the oil-soluble initiator, and the chain transfer agent may be mixed in any order, so long as the polymer A can be obtained. Usually, an aqueous solution of the water-soluble dispersant is firstly prepared. Then the aqueous solution of the dispersant, the monomers, and the chain transfer agent are mixed to prepare a mixed dispersion liquid. The mixed dispersion liquid thus prepared is then mixed with a solution that has been obtained by dissolving the oil-soluble initiator in the nitrile group-containing monomer. Most of water-soluble polymer compounds used as the dispersant are solid materials in, e.g., powdery, granular, or granulated form. Therefore, when the dispersant is mixed at once with water, an undissolved residue (so-called "undissolved lumps") may be formed. When the aqueous dispersant solution containing the undissolved residue is mixed with the monomers and the chain transfer agent, the intrinsic function of the dispersant may not be fully achieved, so that the desired polymer may not be obtained.

For example, when a partially saponified polyvinyl alcohol is used as the dispersant, the following procedure is preferred. Firstly, the dispersant is gradually added to water at room temperature under stirring and well-dispersed therein. Then while the stirring is continued, temperature is gradually increased to about 60° C.-80° C., and the stirring is further continued for 30 minutes to 60 minutes to dissolve the dispersant. When the temperature is increased, a rapid increase in temperature is not preferred because thereby vigorous foaming may occur.

With the thus-obtained aqueous solution of the partially saponified polyvinyl alcohol, monomers such as acrylonitrile are mixed to prepare a mixed dispersion liquid. When the chain transfer agent is used, it is preferable that the chain transfer agent is dissolved in an aliquot of acrylonitrile and then added.

Then the prepared mixed dispersion liquid is mixed with the oil-soluble initiator. When the oil-soluble initiator is in a powdery form and is directly fed to a reaction vessel, the powders may adhere to an upper part of a reaction vessel wall, and a predetermined amount of the oil-soluble initiator may not be fed to the reaction system. In addition, safety problems associated with dust handling operations may arise. Therefore, in order to reliably feed the predetermined amount of the oil-soluble initiator to the reaction vessel for initiating polymerization in the dispersed oil droplets of the predetermined acrylonitrile monomer, it is preferable that part of the acrylonitrile for use is separated in advance, and this solution is fed to the reaction polymerization vessel to initiate the polymerization.

In order to maintain stable polymerization in the suspension polymerization, it is preferable to stir the polymerization system. Stirring can improve the dispersibility of the particles of the polymer A generated, whereby coagulation of the particles of the polymer A that causes the formation of lumps and adhesion of the polymer A to the polymerization vessel can be prevented. Therefore, a normal polymerization state can be stably maintained. However, excessively strong stirring may inhibit production of the polymer A with high molecular weight, and may also cause decrease in polymerization conversion rate. In addition, excessively strong stirring may requires a large amount of energy cost. Therefore, it is preferable to avoid excessively strong stirring, from the viewpoint of production efficiency.

Preferably, the stirring apparatus has a blade shape such as a paddle blade shape, a turbine blade shape, or an anchor blade shape.

The polymerization temperature is a factor that greatly contributes to the molecular weight. The polymerization temperature is set in consideration of, e.g., the type of oil-soluble initiator, the molecular weight to be achieved, and the polymerization conversion rate. Therefore it is difficult to univocally define the polymerization temperature. Usually, for suspension polymerization in an industrial scale using water having a boiling point of 100° C. as the dispersion medium, the polymerization temperature is preferably 40° C. or higher and more preferably 50° C. or higher and is preferably 90° C. or lower and more preferably 80° C. or lower.

During the aforementioned suspension polymerization, the particles of the polymer A are generated in water as particles of about several hundreds of micrometers to several millimeters that are precipitated and deposited. The thus-obtained composition containing water and the polymer A may contain a low-molecular weight polymer in its aqueous phase. Therefore, it is preferable that, if necessary, the water and the polymer A are separated through, e.g., a filter, and the polymer A is washed and purified.

[1-2. Polymer B]

The polymer B contains a repeating unit derived from acrylonitrile or methacrylonitrile (appropriately, referred to hereinbelow as a "(meth)acrylonitrile unit"). The polymer B may contain only the repeating unit derived from acrylonitrile, may contain only the repeating unit derived from methacrylonitrile, or may contain a combination of the repeating unit derived from acrylonitrile and the repeating unit derived from methacrylonitrile. When the polymer B contains the (meth)acrylonitrile unit, appropriate compatibility can be obtained without impairing the property of the polymer A including the nitrile unit as the main component.

The polymer B contains the (meth)acrylonitrile unit in an amount of preferably 10% by weight or more and preferably 40% by weight or less, more preferably 35% by weight or less, and particularly preferably 30% by weight or less. By setting the amount of the (meth)acrylonitrile unit within the aforementioned range, the peel strength of the electrode material layer is improved, and the electrode material layer can have resistance against cracking.

The polymer B also contains a repeating unit other than the (meth)acrylonitrile unit. The repeating unit other than the (meth)acrylonitrile unit may be any unit so long as the effects of the present invention are not significantly impaired. However, it is preferable that an ethylenically unsaturated compound unit is contained. The ethylenically unsaturated compound unit is a repeating unit derived from an ethylenically unsaturated compound, and examples of the ethylenically unsaturated compound may include (meth)acrylate ester monomers.

Examples of the (meth)acrylate ester monomers may include: alkyl acrylate esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylate esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Of these, alkyl acrylate esters in which the alkyl group bonded to the non-carbonyl oxygen atom has 7 to 13 carbon atoms are preferred because they do not cause dissolution into the electrolyte solution, so that they are appropriately swelled with the electrolyte solution and therefore exhibit lithium ion conductivity, and because they are less likely to cause cross-linking coagulation of the polymer in the dispersion in the electrode active material. For example, heptyl acrylate, octyl acrylate, 2-ethylhexyl acrylate, nonyl acrylate, decyl acrylate, and lauryl acrylate are preferred. Of these, alkyl acrylate esters in which the alkyl group bonded to the non-carbonyl oxygen atom has 8 to 10 carbon atoms are preferred, and, e.g., octyl acrylate, 2-ethylhexyl acrylate, and nonyl acrylate are more preferred.

Other examples of the ethylenically unsaturated compound may include vinyl monomers having a carboxylic acid group. Examples of the vinyl monomers having a carboxylic acid group may include: monocarboxylic acids and derivatives thereof; and dicarboxylic acids and derivatives thereof.

Examples of the monocarboxylic acids may include acrylic acid, methacrylic acid, and crotonic acid. Examples of the derivatives of the monocarboxylic acids may include 2-ethyl acrylic acid, isocrotonic acid, α-acetoxy acrylic acid, β-trans-aryloxy acrylic acid, α-chloro-β-E-methoxy acrylic acid, and β-diamino acrylic acid. Examples of the dicarboxylic acids may include maleic acid, fumaric acid, and itaconic acid. Examples of the derivatives of the dicarboxylic acids may include: methyl allyl maleic acids such as methyl maleic acid, dimethyl maleic acid, phenyl maleic acid, chloro maleic acid, dichloro maleic acid, and fluoro maleic acid; and maleic acid monoesters such as diphenyl maleate, nonyl maleate, decyl maleate, dodecyl maleate, octadecyl maleate, and fluoroalkyl maleate.

Of these, vinyl monomers having a carboxylic acid group are preferred because of their have high adhesion to a current collector, and dispersion stability in an electrode slurry which will be described later. Of these, monocarboxylic acids having a carboxylic acid group and 5 or less carbon atoms, such as acrylic acid and methacrylic acid and dicarboxylic acids having two carboxylic acid groups and 5 or less carbon atoms such as maleic acid, itaconic acid, and fumaric acid are preferred. Further, acrylic acid, methacrylic acid, and maleic acid are more preferred, because of higher storage stability they can give to the binder solution containing the produced polymer B, high stability of the electrode slurry when the polymer B is co-used with the polymer A, and high peel strength of the electrode obtained using the electrode slurry.

The ethylenically unsaturated compound may be, e.g., a compound obtained using as part of raw material units any of α-olefins such as ethylene, propylene, 1-butene, 1-pentene, isobutene, and 3-methyl-1-butene and conjugated dienes such as 2-methyl-1,3-butadiene (isoprene), 2,3-dimethyl-1,3-butadiene, 1,3-pentadiene, 1,3-hexadiene, and 1,3-butadiene. When a conjugated diene is used, those which have been subjected to a hydrogenation reaction (appropriately referred to hereinbelow as "hydrogenation") is usually used. In this case, a hydrogenated product of a polymer obtained using 1,3-butadiene is particularly preferred because of ease of polymerization reaction.

No particular limitation is imposed on the method for performing the hydrogenation reaction, and any ordinary method may be used. For example, an organic solvent solution of a diene-based polymer is brought into contact with hydrogen gas to react therewith in the presence of a hydrogenation reaction catalyst such as Raney nickel, a titanocene-based compound, or an aluminum-supported nickel catalyst. When the diene-based polymer has been obtained by emulsion polymerization, it is preferable to perform the reaction by adding a hydrogenation reaction catalyst such as palladium acetate to a polymerization reaction solution, and bringing the resultant aqueous emulsion into contact with hydrogen gas, since such a reaction can be performed with less complexity.

The polymer B contains the ethylenically unsaturated compound unit in an amount of preferably 60% by weight or more, more preferably 65% by weight or more, and particularly preferably 70% by weight or more, and preferably 90% by weight or less. As will be described later, the polymer B has low iodine number, and therefore has small amount of unsaturated bonds in the main chain of the polymer structure, so that the polymer B has oxidation resistance. Since the polymer B has a specific grass transition temperature as will be described later, the polymer B is more flexible than the polymer A. Therefore, the combination of the hard and strong polymer A with the flexible polymer B can improve the foldability of the binder composition of the present invention, so that the peel strength of the electrode material layer can be further improved.

The iodine number of the polymer B is usually 50 g/100 g or smaller, preferably 30 g/100 g or smaller, and more preferably 25 g/100 g or smaller. Having such a low iodine number means that the polymer B contains small amount of unsaturated bonds. Since the polymer B contains small amount of unsaturated bonds, the polymer B has oxidation resistance. Therefore, the foldability of the binder composition of the present invention containing the polymer B can be improved, so that the breakage and peeling of the electrode material layer caused by stress during production of the non-aqueous electrolyte battery or during charging and discharging can be stably prevented. In addition, cycle property can be further improved.

The iodine number may be determined in accordance with JIS-K0070 (1992).

The glass transition temperature of the polymer B is preferably −80° C. or higher and more preferably −60° C. or higher and is preferably −20° C. or lower and more preferably −30° C. or lower. When the grass transition temperature of the polymer B is within the aforementioned range, the flexibility and strength of the electrode material layer using the binder composition of the present invention are well balanced, so that both the cycle property and peel strength can be stably improved.

In the binder composition of the present invention, the weight ratio of the polymer A relative to the polymer B (the polymer A/the polymer B) is usually 3/7 or higher and preferably 4/6 or higher and is usually 8/2 or lower and preferably 7/3 or lower. By combining the polymer A and the polymer B within the aforementioned range, the flexibility and strength of the electrode material layer using the binder composition of the present invention can be well balanced, so that both the cycle property and peel strength can be stably improved.

[1-3. Other Components]

The binder composition of the present invention may contain optional components other than the polymer A and the polymer B, so long as the effects of the present invention are not significantly impaired. Example's of the optional components may include binders other than the polymer A and the polymer B and the same optional components as examples of optional components that may be contained in the electrode material layer or electrode slurry which will be described later. The binder composition of the present invention may contain only one species of optional component or a combination of two or more species thereof at any ratio.

[2. Binder Solution]

The binder composition of the present invention is usually prepared as a liquid (i.e., a binder solution) obtained by dissolving or dispersing, in an organic solvent, the aforementioned polymer A, polymer B, and optional components that may be added if necessary. Usually, the solid contents such as the polymer A, the polymer B, and the optional components that are included in the binder solution are contained in an electrode material layer and function as, e.g., a binder.

Examples of the organic solvent may include: amides such as N-methyl-2-pyrrolidone (NMP), N,N-dimethylacetamide (DMA), and N,N-dimethylformamide (DMF); ureas such as N,N-dimethylethyleneurea, N,N-dimethylpropyleneurea, and tetramethylurea; lactones such as γ-butyrolactone and γ-caprolactone; and sulfoxides such as dimethyl sulfoxide (DMSO). Of these solvents, amides, ureas, lactones, and solvent mixtures containing these solvents are preferred from the viewpoint of, e.g., their ability to dissolve the polymers constituting the binder composition of the present invention. Of these, N-methyl-2-pyrrolidone (NMP) or a solvent mixture containing the same is more preferred. As the solvent, one species thereof may be solely used, or a combination of two or more species thereof may be used at any ratio.

No particular limitation is imposed on the amount of the organic solvent in the binder solution, so long as the amount is equal to or larger than the minimum amount necessary for the polymers constituting the binder composition to maintain their dissolved state at room temperature (25° C.). Usually, viscosity is controlled by adding the solvent in a slurry preparing step for electrode production which will be described later. Therefore, the amount of the organic solvent in the binder solution may be arbitrary set so that the binder solution is not excessively diluted than necessary.

Usually, the binder solution is not used immediately after production but is used after, e.g., storage and transportation. Since the binder composition of the present invention can be stably present in the solvent in a dissolved state, the polymer A and the polymer B are less prone to cause gelation. Therefore, the binder solution containing the binder composition of the present invention has high storage stability.

[3. Electrode for Non-Aqueous Electrolyte Battery]

The electrode for the non-aqueous electrolyte battery of the present invention (i.e., the electrode of the present invention) includes a current collector and an electrode material layer provided on at least one side of the current collector. The electrode material layer may be provided on at least one side of the current collector, but it is preferable that the electrode material layer is provided on both sides.

[3-1. Current Collector]

No particular limitation is imposed on the material of the current collector, so long as it has electroconductivity and is electrochemically durable. From the viewpoint of heat resistance, the material is preferably a metal material such as iron, copper, aluminum, nickel, stainless steel, titanium, tantalum, gold, and platinum. Of these, aluminum is particularly preferred as the material of the current collector, for the positive electrode of a lithium ion secondary battery, and copper is particularly preferred as the material of the current collector for the negative electrode of a lithium ion secondary battery.

No particular limitation is imposed on the shape of the current collector, but a sheet shaped current collector having a thickness of 0.001 mm to 0.5 mm is preferred.

Preferably, the current collector is subjected to a roughing treatment in advance of its use, in order to improve the adhesive strength of the electrode material layer. Examples of the roughening method may include mechanical polishing method, an electrochemical polishing method, and a chemical polishing method. In the mechanical polishing method, polishing cloth or paper having abrasive particles adhering thereon, grindstone, emery wheel, wire brush provided with, e.g., steel wire are used.

In order to improve the adhesive strength and electroconductivity of the electrode material layer, an intermediate layer may be formed on the surface of the current collector.

[3-2. Electrode Material Layer]

In the electrode of the present invention, the electrode material layer contains an electrode active material and the binder composition of the present invention. If necessary, the electrode material layer may further contain a component other than the electrode active material and the binder composition of the present invention. In the electrode material layer, the binder composition of the present invention functions as a binder and performs the action of securing the electrode material layer to the current collector and the action of holding, in the electrode material layer, components contained in the electrode material layer such as the electrode active material. In the electrode of the present invention, the electrode material layer contains the binder composition of the present invention. Therefore, the cycle property can be improved as described above.

(i) Electrode Active Material

As the electrode active material, suitable materials may be used depending on the type of battery of the present invention. In the following description, an electrode active material for a positive electrode is appropriately referred to as a "positive electrode active material", and an electrode active material for a negative electrode is referred to as a "negative electrode active material". In the present invention, preferred examples of the battery may include lithium ion secondary batteries and nickel metal hydride secondary batteries. Therefore, a description will be given of electrode active materials suitable for lithium ion secondary batteries and nickel metal hydride secondary batteries.

Firstly, the types of electrode active materials for lithium ion secondary batteries will be described.

The positive electrode active materials for lithium ion secondary batteries are broadly classified into materials formed of inorganic compounds and materials formed of organic materials. Examples of the positive electrode active materials formed of inorganic compounds may include transition metal oxides, complex oxides of lithium and transition metals, and transition metal sulfides. Examples of the transition metals may include Fe, Co, Ni, and Mn. Specific examples of the positive electrode active material formed of an inorganic compound may include: lithium-containing complex metal oxides such as $LiCoO_2$, $LiNiO_2$, $LiMnO_2$, $LiMn_2O_4$, LiFePO$_4$, and LiFeVO$_4$; transition metal sulfides such as TiS$_2$, TiS$_3$, and amorphous MoS$_2$; and transition metal oxides such as Cu$_2$V$_2$O$_3$, amorphous V$_2$O—P$_2$O$_6$, MoO$_3$, V$_2$O$_6$, and V$_6$O$_{13}$. Specific examples of the positive electrode active material formed of an organic compound may include electroconductive polymer compounds such as polyacetylene and poly-p-phenylene. A positive electrode active material formed of a composite material that is a combination of an inorganic compound and an organic compound may also be used. For example, an iron-based oxide may be subjected to reduction-firing in the presence of a carbon source material to produce a composite material coated with the carbon material, and this composite material may be used as the positive electrode active material. Although the iron-based oxide tends to have low electroconductivity, it can be used as a high-performance positive electrode active material by forming such a composite material. A compound obtained by partial element substitution of any of the aforementioned compounds may also be used as the positive electrode active material.

As the positive electrode active material, one species thereof may be solely used, or a combination of two or more species thereof may be used at any ratio. A mixture of any of the aforementioned inorganic compounds and any of the aforementioned organic compounds may also be used as the positive electrode active material.

Examples of the negative electrode active materials for lithium ion secondary batteries may include: carbonaceous materials such as amorphous carbon, graphite, natural graphite, mesocarbon microbeads, and pitch-based carbon fibers; and electroconductive polymer compounds such as polyacene. Other examples may include: metals such as silicon, tin, zinc, manganese, iron, and nickel and alloys thereof; oxides of the aforementioned metals and alloys; and sulfates of the aforementioned metals and alloys. Still other examples may include: metal lithium; lithium alloys such as Li—Al, Li—Bi—Cd, and Li—Sn—Cd; lithium-transition metal nitrides; lithium-titanium complex oxides; and silicon carbide (Si—O—C).

As an electrode active material, a material having a surface to which an electroconductivity imparting material adheres by a mechanical modifying method may also be used. As the negative electrode active material, one species thereof may be solely used, or a combination of two or more species thereof may be used at any ratio.

Subsequently, the types of electrode active materials for nickel metal hydride secondary batteries will be described.

Examples of the positive electrode active material for the nickel metal hydride secondary battery may include nickel hydroxide particles. The nickel hydroxide particles may contain, e.g., cobalt, zinc and cadmium in a solid solution state. The nickel hydroxide particles may have a surface coated with an alkaline-heat-treated cobalt compound. The nickel hydroxide particles may contain additives such as: yttrium oxide; cobalt compounds such as cobalt oxide, metal cobalt, and cobalt hydroxide; zinc compounds such as metal zinc, zinc oxide, and zinc hydroxide; and rare earth compounds such as erbium oxide. As the positive electrode active material, one species thereof may be solely used, or a combination of two or more species thereof may be used at any ratio.

As the negative electrode active material for the nickel metal hydride secondary battery, hydrogen-absorption alloy particles are usually used.

No particular limitation is imposed on the hydrogen-absorption alloy particles, so long as, they can absorb hydrogen which is electrochemically generated in the non-aqueous electrolyte solution during charging of the non-aqueous battery and can easily release the absorbed hydrogen during discharging. Particles selected from the group consisting of AB$_5$ type-based, TiNi-based, and TiFe-based hydrogen-absorption alloy particles are particularly preferred. Specific examples thereof may include LaNi$_5$, MmNi$_5$ (Mm is a misch metal), LmNi$_5$ (Lm is one or more species selected from rare earth elements including La), as well as multielement-type hydrogen-absorption alloy particles in which a part of Ni in these alloys is substituted with one or more species of element selected from the group consisting of Al, Mn, Co, Ti, Cu, Zn, Zr, Cr, and B. Particularly, hydrogen-absorption alloy particles having a composition represented by the general formula: LmNi$_w$Co$_x$Mn$_y$Al$_z$ (atom ratio values w, x, y, and z are positive numbers satisfying $4.80 \leq w+x+y+z \leq 5.40$) are suitable because thereby micronization associated with progress of charging and discharging cycles is suppressed, and the charging/discharging cycle life is improved. As the negative electrode active material, one species thereof may be solely used, or a combination of two or more species thereof may be used at any ratio.

The particle diameters of the electrode active materials for any of a lithium ion secondary battery and a nickel metal hydride secondary battery may be appropriately selected in consideration of the constituent elements of the non-aqueous electrolyte battery.

The 50% volume cumulative diameter of the positive electrode active material is usually 0.1 μm or larger and preferably 1 μm or larger and is usually 50 μm or smaller and preferably 20 μm or smaller, from the viewpoint of improvement of battery property such as rate property and cycle property.

The 50% volume cumulative diameter of the negative electrode active material is usually 1 μm or larger and preferably 15 μm or larger and is usually 50 μm or smaller and preferably 40 μm or smaller, from the viewpoint of improvement of battery property such as initial efficiency, rate property, and cycle property.

When the 50% volume cumulative diameters of the positive electrode active material and the negative electrode active material are within the aforementioned ranges, a secondary battery having high rate property and cycle property can be achieved, and ease of handling during production of an electrode slurry and electrodes is achieved.

The 50% volume cumulative diameter is a particle diameter when a cumulative volume calculated from the smallest diameter side in a particle size distribution measured by a laser diffraction method reaches 50%.

(ii) Binder (Binder Composition of the Present Invention)

The electrode material layer contains the binder composition of the present invention as a binder. In this case, the amount of the binder composition of the present invention in terms of solid content on the basis of 100 parts by weight of the electrode active material is preferably 0.3 parts by weight or more, more preferably 0.5 parts by weight or more, and particularly preferably 0.8 parts by weight or more and is preferably 5 parts by weight or less, more preferably 3.5 parts by weight or less, and particularly preferably 2 parts by weight or less. When the amount of the binder composition of the present invention is equal to or larger than the lower limit value of the aforementioned range, the strength of the electrode can be increased, and the peel strength of the electrode material layer can be improved. When the amount is equal to or lower than the upper limit value of the aforementioned range, battery property such as cycle property can be improved.

(iii) Other Components

The electrode material layer may contain optional components other than the electrode active material and the binder composition of the present invention, so long as the effects of the present invention are not significantly impaired. The electrode material layer may contain only one species of the optional component or may contain two or more species of optional components.

For example, the electrode material layer may contain a electroconductive agent (also referred to as an electroconductivity-imparting material). Examples of the electroconductive agent may include: electroconductive carbon such as acetylene black, Ketjen black, carbon black, graphite, vapor phase-grown carbon fibers, and carbon nanotubes; powders of carbon such as graphite powder; and fibers and foils of a variety of metals. The use of the electroconductive agent can improve electric contact between electrode active materials. Particularly, when the electroconductive agent is used in a lithium ion secondary battery, discharge rate property can be improved.

The using amount of the electroconductive agent on the basis of 100 parts by weight of the electrode active material is usually 0.1 parts by weight or more and preferably 0.5 parts by weight or more and is usually 5 parts by weight or less and preferably 4 parts by weight or less.

The electrode material layer may contain, e.g., a reinforcing material. Examples of the reinforcing material may include a variety of inorganic and organic spherical, plate-shaped, rod-shaped, and fiber-shaped fillers.

The using amount of the reinforcing agent on the basis of 100 parts by weight of the electrode active material is usually 0 parts by weight or more and preferably 1 part by weight or more and is usually 20 parts by weight or less and preferably 10 parts by weight or less.

In addition to the aforementioned components, the electrode material layer may further contain, e.g., trifluoropropylene carbonate, vinylene carbonate, catechol carbonate, 1,6-dioxaspiro[4,4]nonane-2,7-dione, and 12-crown-4-ether, in order to improve the stability and life of the battery of the present invention.

(iv) Thickness of Electrode Material Layer

The thickness of the electrode material layer in each of the positive electrode and the negative electrode is usually 5 µm or larger and preferably 10 µm or larger and is usually 300 µm or smaller and preferably 250 µm or smaller.

[3-3. Method for Producing Battery]

The electrode of the present invention is produced by, e.g., dissolving or dispersing in a solvent the components to be contained in the electrode material layer to prepare an electrode slurry, then applying the electrode slurry onto a surface of a current collector, and drying the applied electrode slurry.

The electrode slurry contains the electrode active material, the binder composition of the present invention, and the solvent. The slurry further contains an optional component that are contained if necessary in the electrode material layer.

As the solvent for the electrode slurry, any solvent that can dissolve the binder composition of the present invention or can disperse the binder composition of the present invention in a form of particles may be used. When a solvent that can dissolve the binder composition of the present invention is used, the dispersion of the electrode active material etc. is stabilized because the binder composition of the present invention is attached onto their surfaces. It is preferable to select the specific type of solvent on the basis of drying rate and from the environmental point of view.

Examples of the solvent for the electrode slurry may include: cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone (NMP) and N,N-dimethylformamide (DMF). Of these, N-methylpyrrolidone (NMP) is particularly preferred as the solvent for the electrode slurry, from the viewpoint of dispersion stability and coating ability. The solvent for the binder solution as it is may be used as the solvent for the electrode slurry. As the solvent for the electrode slurry, one species thereof may be solely used, or a combination of two or more species thereof may be used at any ratio.

The amount of the solvent in the electrode slurry may be adjusted such that a viscosity suitable for coating depending on the types of electrode active material and binder composition of the present invention is obtained. More specifically, the amount of the solvent for use may be adjusted such that the concentration of solid content in the electrode slurry (i.e., the total solid concentration of the electrode active material, the binder composition of the present invention, and optional components that is contained if necessary) is preferably 30% by weight or more and more preferably 40% by weight or more and is preferably 90% by weight or less and more preferably 80% by weight or less.

The electrode slurry may contain a thickener. As the thickener, a polymer soluble in the solvent for the electrode slurry is usually used. Examples of the thickener may include: cellulose-based polymers such as carboxymethylcellulose, methylcellulose, and hydroxypropylcellulose and ammonium salts and alkali metal salts thereof; (modified) poly (meth)acrylic acid and ammonium salts and alkali metal salts thereof; polyvinyl alcohols such as (modified) polyvinyl alcohols, copolymers of acrylic acid or acrylate salts with vinyl alcohol, and copolymers of maleic anhydride, maleic acid, or fumaric acid with vinyl alcohol; polyethylene glycol; polyethylene oxide; polyvinylpyrrolidone; modified polyacrylic acid; oxidized starch; starch phosphate; casein; and a variety of modified starches. In the present invention, "(modified) poly-" means "unmodified poly-" or "modified poly-". As the thickener, one species thereof may be solely used, or a combination of two or more species thereof may be used at any ratio.

The electrode slurry is obtained by, e.g., mixing the electrode active material, the binder composition of the present invention, the solvent, and an optional component that is used if necessary. Usually, the electrode slurry is produced using the binder solution. Therefore, when the solvent of the binder solution can be used as the solvent for the electrode slurry, the solvent for the electrode slurry does not have to be mixed in addition to the solvent of the binder solution.

No particular limitation is imposed on the order of mixing the components. For example, the aforementioned components may be supplied to a mixer at once and simultaneously mixed. When the electrode active material, the binder composition of the present invention, the solvent, and the electroconductive material are mixed as the components of the electrode slurry, it is usually preferable that a slurry containing the binder composition of the present invention and the electroconductive agent, and a slurry containing the binder composition of the present invention and the electrode active material are separately prepared, then these slurries are mixed, and the concentrations are adjusted with a solvent, to thereby obtain the electrode slurry.

Examples of the mixer may include a ball mill, sand mill, a pigment disperser, a grinder, an ultrasonic disperser, a homogenizer, a planetary mixer, and a Hobart mixer. Of these, a planetary mixer is preferred because the use thereof can suppress coagulation of the electroconductive material and the electrode active material.

The 50% volume cumulative diameter of the particles contained in the electrode slurry is preferably 35 µm or smaller and more preferably 25 µm or smaller. When the 50% volume cumulative diameter of the particles contained in the electrode slurry is within the aforementioned range, high dispersion of the electroconductive material is obtained, and a homogeneous electrode can thus be obtained. Therefore, it is preferable that the mixing by the mixer is performed to a degree in which the 50% volume cumulative diameter of the particles contained in the electrode slurry falls within the aforementioned range.

Usually, the electrode slurry is not used immediately after production but is used after, e.g., storage and transportation. Since the binder composition of the present invention can be stably present in the solvent in a dissolved state, the electrode active material is less prone to cause precipitation, coagulation and gelation. Therefore, the electrode slurry containing the binder composition of the present invention has high storage stability.

After the electrode slurry is prepared, the prepared electrode slurry is applied onto the surface of a current collector. No particular limitation is imposed on the application method. Examples of the application method may include a doctor blade method, a dipping method, a reverse roll method, a direct roll method, a gravure method, an extrusion method, and a brush coating method. When the electrode slurry is applied onto the current collector, the solid content of the electrode slurry (e.g., the electrode active material, and the binder composition of the present invention) adheres to the surface of the current collector in a layer form.

After application of the electrode slurry, the solid content of the electrode slurry that has adhered in a layer form are dried. Examples of the drying method may include: drying by, e.g., warm air, hot air, and low-moisture air; vacuum drying; and drying by irradiation with infrared rays, far-infrared rays, and an electron beam. In this manner, an electrode material layer is formed on the surface of the current collector, whereby the electrode of the present invention is obtained.

If necessary, a heat treatment may be performed after the application of the electrode slurry. The heat treatment may be performed, e.g., at a temperature of about 80° C. to about 120° C. for 10 minutes to 1 hour. In addition, in order to remove the residual solvent and adsorbed water in the electrode, vacuum drying may be performed, e.g., at a temperature of 100° C. to 150° C. for 1 hour to 20 hours.

It is preferable to subsequently perform a pressure treatment onto the electrode material layer using, e.g., a die press, or a roll press. As a result of the pressure treatment, the porosity of the electrode material layer can be reduced. The porosity is preferably 5% or higher and more preferably 7% or higher and is preferably 15% or lower and more preferably 13% or lower. Too low porosity might cause difficulty in elevating volumetric capacity, and might also increase tendency to cause peel-off of the electrode material layer to induce defects. Too high porosity might cause decrease in charging efficiency and discharging efficiency.

[4. Non-Aqueous Electrolyte Battery]

The non-aqueous electrolyte battery of the present invention (i.e., the battery of the present invention) includes a positive electrode, a negative electrode, and a non-aqueous electrolyte solution, and at least one of the positive electrode and the negative electrode is the electrode of the present invention. Usually, the battery of the present invention is a secondary battery and may be, e.g., a lithium ion secondary battery or a nickel metal hydride secondary battery. Particularly, the battery of the present invention is preferably a lithium ion secondary battery. Since the battery of the present invention includes the electrode of the present invention produced using the binder composition of the present invention, the battery of the present invention has high cycle property. In addition to the positive electrode, the negative electrode and the non-aqueous electrolyte solution, the battery of the present invention may further include another constituent, such as a separator.

[4-1. Electrode]

In the battery of the present invention, the electrode of the present invention is used as at least one of the positive electrode and the negative electrode. The electrode of the present invention may be used as the positive electrode or the negative electrode or used as both the positive electrode and the negative electrode.

[4-2. Non-Aqueous Electrolyte Solution]

The non-aqueous electrolyte solution usually contains an organic solvent and an electrolyte dissolved in the organic solvent.

(i) Organic Solvent

As the organic solvent for use, a solvent may be appropriately selected from known solvents for non-aqueous electrolyte solutions. Examples of such an organic solvent may include cyclic carbonates having no unsaturated bond, chain carbonates, cyclic ethers, chain ethers, cyclic carboxylate esters, chain carboxylate esters, and phosphorus-containing organic solvents.

Examples of the cyclic carbonates having no unsaturated bond may include alkylene carbonates having an alkylene group with 2 to 4 carbon atoms such as ethylene carbonate, propylene carbonate, and butylene carbonate. Of these, ethylene carbonate and propylene carbonate are preferred.

Examples of the chain carbonates may include dialkyl carbonates having an alkyl group with 1 to 4 carbon atoms such as dimethyl carbonate, diethyl carbonate, di-n-propyl carbonate, ethyl methyl carbonate, methyl-n-propyl carbonate, and ethyl-n-propyl carbonate. Of these, dimethyl carbonate, diethyl carbonate, and ethyl methyl carbonate are preferred.

Examples of the cyclic ethers may include tetrahydrofuran and 2-methyltetrahydrofuran.

Examples of the chain ethers may include dimethoxyethane and dimethoxymethane.

Examples of the cyclic carboxylate esters may include γ-butyrolactone and γ-valerolactone.

Examples of the chain carboxylate esters may include methyl acetate, methyl propionate, ethyl propionate, and methyl butyrate.

Examples of the phosphorus-containing organic solvents may include trimethyl phosphate, triethyl phosphate, dimethyl ethyl phosphate, methyl diethyl phosphate, ethylene methyl phosphate, and ethylene ethyl phosphate.

As the organic solvent, one species thereof may be solely used, or a combination of two or more species thereof may be used at any ratio. However, it is preferable to use a combination of two or more types of compounds. For example, a solvent having a high dielectric constant such as alkylene carbonates and cyclic carboxylate esters, and a solvent having a low viscosity such as dialkyl carbonates and chain carboxylate esters are preferably used in combination since thereby high lithium ion conductivity is achieved and high capacity can be obtained.

(ii) Electrolyte

As the electrolyte, a suitable electrolyte may be used depending on the type of battery of the present invention. In the non-aqueous electrolyte solution, the electrolyte is usually present as a supporting electrolyte dissolved in the organic solvent. Usually, a lithium salt is used as the electrolyte.

Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these, $LiPF_6$, $LiClO_4$, $CF_3SO_3Li$, and $LiBF_4$ are preferred because they are easily dissolved in the organic solvent and have high degree of dissociation. Use of an electrolyte having a high degree of dissociation increases the lithium ion conductivity. Therefore, the lithium ion conductivity can be controlled by selecting the type of electrolyte.

As the electrolyte, one species thereof may be solely used, or a combination of two or more species thereof may be used at any ratio.

The amount of the electrolyte contained in the non-aqueous electrolyte solution on the basis of 100% by weight of the non-aqueous electrolyte solution is usually 1% by weight or more and preferably 5% by weight or more and is usually 30% by weight or less and preferably 20% by weight or less. Depending on the type of the electrolyte, the electrolyte may be used at a concentration of usually 0.5 mol/L to 2.5 mol/L. If the concentration of the electrolyte is too low or too high, the ion conductivity tends to decrease. Usually, the lower the concentration of the electrolyte is, the higher the swelling degree of the polymer particles serving as the binder. Therefore, by controlling the concentration of the electrolyte, the lithium ion conductivity can be controlled.

(iii) Other Components

The non-aqueous electrolyte solution may contain an optional component other than the organic solvent and the electrolyte, so long as the effects of the present invention are not significantly impaired. The non-aqueous electrolyte solution may contain only one species of optional component or may contain two or more species of optional components at any ratio.

Examples of the optional component may include cyclic carbonate esters having an unsaturated bond in their molecules, an overcharge protection agent, a deoxidizing agent, and a dehydrating agent. Examples of the additive may include carbonate-based compounds such as vinylene carbonate (VC).

(iv) Method for Producing Non-Aqueous Electrolyte Solution

The non-aqueous electrolyte solution may be produced by, e.g., dissolving the electrolyte and, if necessary, an optional component in the organic solvent. For producing the non-aqueous electrolyte solution, it is preferable that the raw materials are dehydrated in advance of mixing. It is desirable to perform dehydration until the water content becomes usually 50 ppm or lower and preferably 30 ppm or lower.

[4-3. Separator]

The separator is a member provided between the positive electrode and the negative electrode for preventing a short circuit between the electrodes. As the separator, a porous substrate having a porous portion is usually used. Examples of the separator may include (a) a porous separator having a porous portion, (b) a porous separator having a polymer coating layer formed on its one side or both sides, and (c) a porous separator having formed thereon a porous coating layer including an inorganic filler or an organic filler.

As (a) the porous separator having a porous portion, e.g., a porous film having a fine pore diameter, having high resistance to the organic solvent, having no electron conductivity, but having ion conductivity, is used. Specific examples of such a porous film may include: fine porous films formed of resins such as polyolefin-based polymers (for example, polyethylene, polypropylene, polybutene, and polyvinyl chloride), mixtures thereof, and copolymers thereof; fine porous films formed of resins such as polyethylene terephthalate, polycycloolefins, polyether sulfone, polyamides, polyimides, polyimideamides, polyaramides, polycycloolefins, nylon, and polytetrafluoroethylene; woven products obtained by weaving polyolefin-based fibers and nonwoven fabrics of the polyolefin-based fibers; and aggregates of insulating material particles.

Examples of (b) the porous separator having a polymer coating layer formed on its one side or both sides may include: polymer films for solid polymer electrolytes and gel-like polymer electrolytes such as polyvinylidene fluoride, polyethylene oxide, polyacrylonitrile, and polyvinylidene fluoride hexafluoropropylene copolymers; and gelated polymer coating layers.

Examples of (c) the porous separator having formed thereon a porous coating layer including an inorganic filler or an organic filler may include a separator coated with a porous film layer formed of an inorganic filler or an organic filler and the aforementioned dispersant for the filler.

Of these, the separator coated with a porous film layer formed of an inorganic filler or an organic filler and the aforementioned dispersant for the filler is preferred because the total thickness of the separator can be reduced to increase the ratio of the active materials in the battery, so that the capacity per volume can be increased.

The thickness of the separator is usually 0.5 µm or larger and preferably 1 µm or larger and is usually 40 µm or smaller, preferably 30 µm or smaller, and more preferably 10 µm or smaller. When the thickness is within this range, the resistance due to the separator in the battery decreases, and workability during production of the battery is excellent.

[4-4. Method for Producing Non-Aqueous Battery]

No particular limitation is imposed on the method for producing the battery of the present invention. For example, the negative electrode and the positive electrode are stacked with the separator interposed therebetween, and the stack is, e.g., then wound or folded in conformity with the battery shape, to put the stack into the battery container. Then the non-aqueous electrolyte solution is poured into the battery container, and the container is sealed. If necessary, an overcurrent protective element such as expanded metal, a fuse and a PTC element, and a lead plate may be provided, whereby a pressure increase inside the battery and overcharging/overdischarging may be prevented. The shape of the battery may be any of a laminated cell type, a coin type, a button type, a sheet type, a cylinder type, a rectangular shape, and an oblate type.

EXAMPLES

The present invention will be specifically described hereinbelow by way of Examples. However, the present invention is not limited to the following Examples and may be modified for implementation within the scope of the claims and equivalents thereto.

In the following description, "part" and "%" representing the amount are on the basis of weight, unless otherwise specified.

[Preparation of Compositions for Electrodes of Non-Aqueous Electrolyte Battery]

Synthesis Example A-1

(Synthesis of Polymer A-1)

A pressure resistant vessel equipped with a stirrer, thermometer, a cooling tube, and a nitrogen gas introduction tube was charged with 400 parts of ion exchanged water. While the stirrer was rotated slowly, pressure was reduced (−600 mm Hg), and then the pressure was returned to normal pressure using nitrogen gas. This procedure was repeated three times. Then, using a dissolved oxygen meter, the oxygen concentration in a vapor phase portion in the reaction vessel was confirmed to be 1% or lower and oxygen dissolved in water was confirmed to be 1 ppm or lower. Then 0.2 parts of partially saponified polyvinyl alcohol ("GOHSENOL GH-20" manufactured by The Nippon Synthetic Chemical Industry Co., Ltd. (saponification degree: 86.5 mol % to 89.0 mol %)) serving as a dispersant was gradually added and well dispersed. Then temperature was gradually increased to 60° C. under continuous stirring, and this state was maintained for 30 minutes to dissolve the partially saponified polyvinyl alcohol.

Subsequently 85 parts of acrylonitrile serving as a nitrile group-containing monomer, 5 parts of methacrylic acid serving as an ethylenically unsaturated compound, and 0.2 parts of t-dodecyl mercaptan serving as a chain transfer agent were put thereinto under the condition of a nitrogen gas flow rate of 0.5 ml/min, and the resultant mixture was stirred and mixed while keeping the temperature at 60±2° C. A solution obtained by dissolving 0.4 parts of 1,1-azobis(1-acetoxy-1-phenylethane) ("OTAZO-15" manufactured by Otsuka Chemical Co., Ltd.) serving as an oil-soluble polymerization initiator in 10 parts of acrylonitrile serving as the nitrile group-containing monomer was added to the aforementioned mixture to initiate the reaction. The reaction was allowed to proceed at 60±2° C. for 3 hours. Then the reaction was continued at 70±2° C. for 2 hours and allowed to further proceed at 80±2° C. for 2 hours. Then the mixture was cooled to 40° C. or lower to thereby obtain polymer particles. The obtained polymer particles were collected using a 200-mesh filter cloth, washed three times with 100 parts of ion exchanged water, and dried at 70° C. under reduced pressure for 12 hours to isolate and purify the polymer particles, whereby polymer A-1 was obtained (yield: 70%).

At this point, the inner wall of the pressure resistant vessel was visually checked to evaluate the state of adhesion of the polymer A to the inner wall. The result is shown in Table 2 as a scale of status. The evaluation in Table 2 was made in accordance with the following criteria.

A: The degree of adhesion was about 1/20 or smaller of the surface area of the inner wall.

B: The degree of adhesion was larger than about 1/20 and about 1/10 or smaller of the surface area of the inner wall.

C: The degree of adhesion was larger than about 1/10 of the surface area of the inner wall.

(Preparation of NMP Solution and Varnish)

Then a pressure resistant vessel equipped with a stirrer, a thermometer, a cooling tube, and a nitrogen gas introduction tube was charged with 1,800 parts of N-methyl-2-pyrrolidone (referred to hereinbelow as "NMP") with respect to 100 parts of the polymer A-1. Temperature was increased to 80±2° C. under stirring with the flow of a trace amount (200 mL/min) of nitrogen gas. Then dissolution was performed for 3 hours. For removing containing water, stirring and dissolution were continued at 85±2° C. under reduced pressure (25 Torr or lower) until the water content became 1,000 ppm or smaller. Then the mixture was cooled to 40° C. or lower and filtrated using a 100 μm filtration filter to thereby obtain a varnish of the polymer A-1, which is a nitrile-based polymer (resin content: 6% by weight).

The weight-average molecular weight Mw and molecular weight distribution (Mw/Mn, Mn: number-average molecular weight) of the obtained polymer A-1 were measured by GPC (gel permeation chromatography). The GPC was performed in accordance with the following method using dimethylformamide (DMF) as an eluent. The values of the measured weight-average molecular weight Mw and molecular weight distribution Mw/Mn are shown in Table 2.

<Molecular Weight Measurement (GPC Measurement)>
(Preparation of Measurement Sample)

The polymer A-1 was added to about 5 mL of the eluent such that the concentration of solid content was about 0.5 g/L and was slowly dissolved at room temperature. After dissolution was visually checked, the solution was filtrated through a 0.45 μm filter to thereby prepare a measurement sample.

(Measurement Conditions)

The measurement apparatus was as follows.

Columns: TSKgel α-M×2 (φ7.8 mm I.D.×30 cm×2, manufactured by Tosoh Corporation)

Eluent: dimethylformamide (50 mM lithium bromide, 10 mM phosphoric acid)

Flow rate: 0.5 mL/min.

Sample concentration: about 0.5 g/L (solid content concentration)

Injection amount: 200 μL

Column temperature: 40° C.

Detector: differential refractometer RI (HLC-8320 GPC RI detector, manufactured by Tosoh Corporation)

Detection conditions: RI: Pol (+), Res (1.0 s)

Molecular weight marker: standard polystyrene kit PStQuick Kit-H, manufactured by Tosoh Corporation Synthesis Example A-2

Polymer A-2 was obtained by the same procedure as in Synthesis Example A-1 except that 5 parts of acrylic acid was used as the ethylenically unsaturated compound. The yield was 65%.

Then a varnish of the polymer A-2 was obtained by the same procedure as in Synthesis Example A-1.

The values of the weight-average molecular weight Mw and molecular weight distribution Mw/Mn of the obtained polymer A-2 are shown in Table 2.

Synthesis Example A-3

Polymer A-3 was obtained by the same procedure as in Synthesis. Example A-1 except that the amount of partially saponified polyvinyl alcohol was changed to 0.4 parts, the amount of acrylonitrile serving as the nitrile group-containing monomer was changed to 98 parts (including 10 parts used as the solvent for the polymerization initiator), the amount of methacrylic acid serving as the ethylenically unsaturated compound was changed to 2 parts, and the amount of 1,1-azobis(1-acetoxy-1-phenylethane) serving as the polymerization initiator was changed to 0.6 parts. The yield was 72%.

Then a varnish of the polymer A-3 was obtained by the same procedure as in Synthesis Example A-1.

The values of the weight-average molecular weight Mw and molecular weight distribution Mw/Mn of the obtained polymer A-3 are shown in Table 2.

Synthesis Example A-4

Polymer A-4 was obtained by the same procedure as in Synthesis Example A-1 except that the amount of partially saponified polyvinyl alcohol was changed to 0.3 parts, 99.5 parts of methacrylonitrile (including 10 parts used as the solvent for the polymerization initiator) was used as the nitrile group-containing monomer, 0.5 parts of acrylic acid was used as the ethylenically unsaturated compound, and 0.2 parts of 2,2'-azobisisobutyronitrile ("AIBN" manufactured by Tokyo Chemical Industry Co., Ltd.) was used as the polymerization initiator. The yield was 65%.

Then a varnish of the polymer A-4 was obtained by the same procedure as in Synthesis Example A-1.

The values of the weight-average molecular weight Mw and molecular weight distribution Mw/Mn of the obtained polymer A-4 are shown in Table 2.

Synthesis Example A-5

Polymer A-5 was obtained by the same procedure as in Synthesis Example A-1 except that the amount of partially saponified polyvinyl alcohol was changed to 0.3 parts, the amount of acrylonitrile serving as the nitrile group-containing monomer was changed to 85 parts (including 10 parts used as the solvent for the polymerization initiator), 5 parts of acrylic acid and 10 parts of methacrylic acid were used as the ethylenically unsaturated compounds, and 0.3 parts of dimethyl-2,2'-azobis(2-methylpropionate) ("V-601" manufactured by Wako Pure Chemical Industries, Ltd.) was used as the polymerization initiator. The yield was 65%.

Then a varnish of the polymer A-5 was obtained by the same procedure as in Synthesis Example A-1.

The values of the weight-average molecular weight Mw and molecular weight distribution Mw/Mn of the obtained polymer A-5 are shown in Table 2.

Synthesis Example A-6

Polymer A-6 was obtained by the same procedure as in Synthesis Example A-1 except that the amount of partially saponified polyvinyl alcohol was changed to 0.6 parts, 90 parts of acrylonitrile (including 10 parts used as the solvent for the polymerization initiator) and 5 parts of methacrylonitrile were used as the nitrile group-containing monomers, 4 parts of maleic acid and 1 part of itaconic acid were used as the ethylenically unsaturated compounds, and the amount of 1,1-azobis(1-acetoxy-1-phenylethane serving as the polymerization initiator was changed to 0.45 parts. The yield was 60%.

Then a varnish of the polymer A-6 was obtained by the same procedure as in Synthesis Example A-1.

The values of the weight-average molecular weight Mw and molecular weight distribution Mw/Mn of the obtained polymer A-6 are shown in Table 2.

Synthesis Example A-7

Polymer A-7 was obtained by the same procedure as in Synthesis Example A-1 except that the amount of partially saponified polyvinyl alcohol was changed to 0.6 parts, the amount of acrylonitrile serving as the nitrile group-containing monomer was changed to 90 parts (including 10 parts used as the solvent for the polymerization initiator), 5 parts of methacrylic acid and 5 parts of 2-ethylhexyl acrylate (abbreviated as "2-EHA") were used as the ethylenically unsaturated compounds, and the amount of 1,1-azobis(1-acetoxy-1-phenylethane) serving as the polymerization initiator was changed to 0.5 parts. The yield was 63%.

Then a varnish of the polymer A-7 was obtained by the same procedure as in Synthesis Example A-1.

The values of the weight-average molecular weight Mw and molecular weight distribution Mw/Mn of the obtained polymer A-7 are shown in Table 3.

Synthesis Example A-8

Polymer A-8 was obtained by the same procedure as in Synthesis Example A-1 except that the amount of acrylonitrile serving as the nitrile group-containing monomer was changed to 100 parts (including 10 parts used as the solvent for the polymerization initiator), and no ethylenically unsaturated compound was used. The yield was 70%.

Then a varnish of the polymer A-8 was obtained by the same procedure as in Synthesis Example A-1.

The values of the weight-average molecular weight Mw and molecular weight distribution Mw/Mn of the obtained polymer A-8 are shown in Table 3.

Synthesis Example A-9

Polymer A-9 was obtained by the same procedure as in Synthesis Example A-1 except that the amount of ion exchanged water used when the dispersion liquid was prepared was changed to 395 parts, the amount of acrylonitrile serving as the nitrile group-containing monomer was changed to 96 parts, the amount of methacrylic acid serving as the ethylenically unsaturated compound was changed to 4 parts, and a solution of 0.5 parts of a water-soluble polymerization initiator (ammonium persulfate: abbreviated as "APS") in 5 parts of ion exchanged water was used as the polymerization initiator. The yield was 72%.

Then a varnish of the polymer A-9 was obtained by the same procedure as in Synthesis Example A-1.

The values of the weight-average molecular weight Mw and molecular weight distribution Mw/Mn of the obtained polymer A-9 are shown in Table 3.

Synthesis Example A-10

An attempt was made to produce a polymer by the same procedure as in Synthesis Example A-1 except that the amount of acrylonitrile serving as the nitrile group-containing monomer was changed to 75 parts (including 10 parts used as the solvent for the polymerization initiator), 10 parts of methacrylic acid and 15 parts of acrylic acid were used as the ethylenically unsaturated compounds, and 0.3 parts of dimethyl-2,2'-azobis(2-methylpropionate) was used as the polymerization initiator. However, significant coagulation of the polymerization reaction product occurred during the polymerization reaction, so that the reaction was difficult to control. Therefore, the continuation of the reaction was abandoned. As a result, no polymer was obtained.

Synthesis Example A-11

Polymer A-11 was obtained by the same procedure as in Synthesis Example A-9 except that the amount of acrylonitrile serving as the nitrile group-containing monomer was changed to 90 parts, 5 parts of methacrylic acid and 5 parts of acrylic acid were used as the ethylenically unsaturated compounds, and 0.5 parts of APS that is a water soluble polymerization initiator was used as the polymerization initiator. The yield was 74%.

Then a varnish of the polymer A-11 was obtained by the same procedure as in Synthesis Example A-1.

The values of the weight-average molecular weight Mw and molecular weight distribution Mw/Mn of the obtained polymer A-11 are shown in Table 3.

Synthesis Example A-12

Polymer A-12 was obtained by the same procedure as in Synthesis Example A-1 except that the amount of partially saponified polyvinyl alcohol was changed to 0.4 parts, 5 parts of acrylic acid was used as the ethylenically unsaturated compound, the amount of 1,1-azobis(1-acetoxy-1-phenylethane) serving as the polymerization initiator was changed to 0.2 parts, and the polymerization was performed at a reaction temperature of 60±2° C. for 5 hours and then at 80±2° C. for 2 hours. The yield was 52%.

Then a varnish of the polymer A-12 was obtained by the same procedure as in Synthesis Example A-1.

The values of the weight-average molecular weight Mw and molecular weight distribution Mw/Mn of the obtained polymer A-12 are shown in Table 3.

Synthesis Example B-1

(Synthesis of Polymer B-1)

70 Parts of ion exchanged water and 0.3 parts of sodium dodecylbenzene sulfonate were supplied to a pressure resistant vessel equipped with a stirrer, a thermometer, a cooling tube, and a nitrogen gas introduction tube and sufficiently stirred and mixed. The gas phase was replaced with nitrogen gas, and temperature was elevated to 70° C.

In a separate vessel, 50 parts of ion exchanged water, 0.5 parts of sodium dodecylbenzene sulfonate, as well as polymerizable monomers that are 80 parts of 2-ethylhexyl acrylate, 5 parts of maleic acid and 15 parts of acrylonitrile and were mixed to obtain a monomer mixture.

The monomer mixture was continuously added to the pressure resistant vessel over 4 hours to perform polymerization. The reaction was initiated by adding 0.5 parts of potassium persulfate that was formulated as a 3% aqueous potassium persulfate solution to the pressure resistant vessel upon initiation of the addition of the monomer mixture. During addition of the monomer mixture, the reaction was performed at 70° C.

After completion of the addition, the mixture was further stirred at 80° C. for 3 hours, and then the reaction was terminated, whereby a dispersion liquid of polymer B-1 was obtained. The polymerization conversion rate was 98.5%.

The obtained dispersion liquid was cooled to 30° C. or lower, and the coagulated product was filtrated using a 100 μm cartridge filter. The polymer B-1 was thereby obtained.

(Preparation of Varnish)

A pressure resistant vessel equipped with a stirrer, thermometer, a cooling tube, and a nitrogen gas introduction tube was charged with 1,500 parts of NMP with respect to 100 parts of the solid content in the aforementioned dispersion liquid (i.e., the polymer B-1), and dissolution and mixing were performed at 50±2° C. for 2 hours. Then rough dehydration was performed at 85±5° C. and 50 Torr or lower. Then, unreacted monomers were removed at 95±3° C. and 25 Torr or lower, and water contained was removed. After the water content was confirmed to be 1,000 ppm or smaller, the mixture was cooled to 40° C. or lower and filtrated using a 5 μm filtration filter to thereby obtain a varnish of the polymer B-1 (resin content: 8% by weight).

The iodine number of the obtained polymer B-1 was measured. The measured iodine number is shown in Table 4.

The iodine number was measured in accordance with JIS-K0070 (1992) as follows.

(Measurement of Iodine Number)

The varnish of the polymer B-1 was precisely weighed into a 300 mL Erlenmeyer flask with a ground stopper such that the resin solid content was about 300 mg, and about 20 mL of chloroform was added to dissolve and disperse the varnish. 25 mL of a Wijs solution (a solution prepared by separately dissolving 7.9 g of iodine trioxide and 8.9 g of iodine in acetic acid, then mixing the solutions, and adjusting the total volume to 1 L with acetic acid) was added using a measuring pipette, and the ground stopper was secured using a clamp. Temperature was maintained in a thermostatic bath at 25±1.0° C., and the reaction was performed in a dark place for 1 hour. Then about 20 mL of a 100 g/L potassium iodide solution and about 100 mL of ion exchanged water were added. Immediately after the addition, titration was performed using 0.1 mol/L sodium thiosulfate, and the iodine number was determined using the following calculation formula.

$$\text{Iodine number (g/100 g)} = (BL1-EP1) \times f \times (C1/S)$$

BL1: Blank value (mL)
EP1: Titration amount (mL)
f: Factor of titrant (f=1.003)
C1: Concentration conversion coefficient (1.269)
(amount (mg) of iodine equivalent to 1 mL of 0.1 mol/L $Na_2S_2O_3 \cdot 5H_2O$)
S: Amount of sample collected (g)

A blank test (titration) was previously performed under the same measurement conditions to determine the blank value, and the determined blank value was used.

The measurement was repeated three times, and the average of the measurements was used.

For the titration, an automatic potentiometric water titrator (manufactured by Kyoto Electronics Manufacturing Co., Ltd., main unit: AT-610, electrode: platinum micro combination electrode C-778) was used.

The glass transition temperature of the polymer B-1 was measured by the following method using DSC. The results are shown in Table 4.

(Measurement of Glass Transition Temperature (Tg))

Production of Polymer Film for Measurement

The varnish of the polymer B-1 was spread on a glass-made petri dish such that the dried varnish had a thickness of about 1.5 mm, and the varnish was then air-dried at room temperature for 24 hours. Subsequently, the varnish was dried at 70° C. for 12 hours under reduced pressure to produce a polymer film for glass transition temperature measurement.

Measurement Conditions

About 10 mg of the produced polymer film was precisely weighed into an aluminum pan for measurement and subjected to the measurement. The measurement apparatus used was a differential scanning calorimeter ("EXSTAR6000DSC" manufactured by Seiko Instruments Inc.). The measurement temperature range was −120 to 120° C., and the temperature rising rate was 20° C./min. The analysis was started from a second scan.

Synthesis Example B-2

A pressure resistant vessel equipped with a stirrer, a thermometer, a cooling tube, and a nitrogen gas introduction tube was charged, in the following order, with 180 parts of ion exchanged water, 25 parts of an aqueous sodium dodecylbenzene sulfonate solution having a concentration of 10% by weight, 35 parts of acrylonitrile serving as a polymerizable monomer, and 0.5 parts of t-dodecyl mercaptan serving as a chain transfer agent. The gas inside the pressure resistant vessel was replaced with nitrogen three times, and then the pressure resistant vessel was further charged with 65 parts of 1,3-butadiene serving as a polymerizable monomer.

Then the pressure resistant vessel was maintained at 5° C. and charged with 0.1 parts of cumene hydroperoxide serving as a polymerization initiator, and a polymerization reaction was performed for 16 hours by the emulsion polymerization method. 0.1 Parts of an aqueous hydroquinone solution of a concentration of 10% by weight serving as a polymerization terminator was added to terminate the polymerization reaction, and remaining monomers were removed using a rotary evaporator with a water temperature of 60° C. A dispersion liquid of an acrylonitrile-butadiene copolymer including 35% by weight of acrylonitrile unit and 65% by weight of butadiene unit (solid content concentration: about 30% by weight) was thereby obtained.

A palladium catalyst was added to the pressure resistant vessel such that the amount of palladium was 1,000 ppm with respect to the solid content (the acrylonitrile-butadiene copolymer) contained in the dispersion liquid to perform a hydrogenation reaction at hydrogen pressure of 3 MPa and a temperature of 50° C., whereby a dispersion liquid of a hydrogenated product serving as polymer B-2 was obtained-Then the same procedure as in Synthesis Example B-1 was performed to obtain a varnish of the polymer B-2.

The values of the iodine number and glass transition temperature of the obtained polymer B-2 are shown in Table 4.

Synthesis Example B-3

A dispersion liquid of a hydrogenated product serving as polymer B-3 was obtained by the same procedure as in Synthesis Example B-2 except that 20 parts of methacrylonitrile, 75 parts of 1,3-butadiene, and 5 parts of maleic acid were used as the polymerizable monomers.

Then the same procedure as in Synthesis Example B-2 was performed to obtain a varnish of the polymer B-3. The values of the iodine number and glass transition temperature of the obtained polymer B-3 are shown in Table 4.

Synthesis Example B-4

A dispersion liquid of polymer B-4 was obtained by the same procedure as in Synthesis Example B-1 except that the amount of acrylonitrile was changed to 8 parts and the amount of 2-ethylhexyl acrylate was changed to 87 parts.

Then the same procedure as in Synthesis Example B-1 was performed to obtain a varnish of the polymer B-4. The values of the iodine number and glass transition temperature of the obtained polymer B-4 are shown in Table 4.

Synthesis Example B-5

A varnish of polymer B-5 was obtained by the same procedure as in Synthesis Example B-1 except that 45 parts of acrylonitrile, 50 parts of 2-ethylhexyl acrylate, and 5 parts of methacrylic acid were used as the polymerizable monomers. The values of the iodine number and glass transition temperature of the obtained polymer B-5 are shown in Table 4.

Synthesis Example B-6

A varnish of polymer B-6 was obtained by the same procedure as in Synthesis Example B-1 except that 45 parts of acrylonitrile, 52 parts of 2-ethylhexyl acrylate, and 3 parts of maleic acid were used as the polymerizable monomers. The values of the iodine number and glass transition temperature of the obtained polymer B-6 are shown in Table 4.

Synthesis Example B-7

A varnish of polymer B-8 was obtained by the same procedure as in Synthesis Example B-1 except that 5 parts of methacrylonitrile, 85 parts of 2-ethylhexyl acrylate, and 10 parts of maleic acid were used as the polymerizable monomers. The values of the iodine number and glass transition temperature of the obtained polymer B-7 are shown in Table 4.

Example 1

(Preparation of Positive Electrode Slurry)
Using a planetary mixer, 5 parts (in terms of solid content) of a binder solution was mixed with 30 parts of acetylene black ("HS-100" manufactured by Denki Kagaku Kogyo Kabushiki Kaisha, average particle diameter: 48 nm) serving as a electroconductive agent. As the binder solution, a solution mixture obtained by mixing the varnish of the polymer A-1 and the varnish of the polymer B-1 such that (polymer A-1)/(polymer B-1)=4/6 (solid content weight ratio) was used. Then N-methylpyrrolidone was added in two portions, and the mixture was mixed for 30 minutes to thereby obtain a electroconductive agent dispersion liquid with a solid content concentration of 27%. In the obtained electroconductive agent dispersion liquid, the ratio of solid content is (acetylene black)/(polymer A)/(polymer B)=30/2/3.

In a separate planetary mixer, 7 parts (in terms of solid content) of the electroconductive dispersion liquid prepared in the above was mixed with 200 parts of a lithium-containing cobalt oxide-based electrode active material ("CELLSEED C-10N" manufactured by Nippon Chemical Industrial Co., Ltd., average particle diameter: 10 μm). Further, 1 part (in terms of solid content) of the binder solution containing the varnish of the polymer A-1 and the varnish of the polymer B-1 such that (polymer A-1)/(polymer B-1)=4/6 (solid content weight ratio) was added, and the mixture was mixed and dispersed for 1 hour. Then N-methylpyrrolidone was added in two portions, and the mixture was mixed for 10 minutes and subjected to defoaming under reduced pressure to thereby obtain a positive electrode slurry with a final solid content concentration of 75%.

(Production of Positive Electrode)
The aforementioned positive electrode slurry was applied onto the surface of a 20 μm-thick aluminum foil serving as a current collector to a dry thickness of about 120 μm using a die coater, dried at 60° C. for 20 minutes, and subjected to a heat treatment at 150° C. for 2 hours to thereby obtain a raw electrode plate. The raw electrode plate was rolled using a roll press to produce a positive electrode plate in which the density was controlled to 3.7 g/cm$^3$ and the total thickness of the aluminum foil and a positive electrode material layer was controlled to 100 μm. For removing the solvent remaining in the positive electrode plate and adsorbed water, a drying treatment was performed under reduced pressure at 120° C. for 12 hours.

(Production of Battery)
The obtained positive electrode plate was cut into a disc-shaped sheet having a diameter of 15 mm. A separator formed of a polypropylene-made disc-shaped porous film having a diameter of 18 mm and a thickness of 25 μm, metal lithium used as a negative electrode, and expanded metal were sequentially stacked on the surface of the positive electrode material layer of the positive electrode. Then a few drops of an electrolyte solution (a 1M solution of $LiPF_6$ in a mixture of (ethylene carbonate)/(diethyl carbonate)/(dimethyl carbonate)=1/1/1 (volume ratio)) were dropped thereon to the extent that the solution did not spill over. The resultant product was placed in a coin-type outer container made of stainless steel (diameter: 20 mm, height: 1.8 mm, thickness of stainless steel: 0.25 mm) equipped with a polypropylene packing.

Then a stainless steel cap having a thickness of 0.2 mm was put on and secured to the outer container through a polypropylene packing such that no air bubbles remained in the container. The resultant container was sealed using a caulking tool for producing a coin cell to thereby produce a lithium ion secondary battery having a diameter of 20 mm and a thickness of about 2 mm for evaluation of the positive electrode. The entirety of the aforementioned operation was performed in a glove box under an argon atmosphere. For the produced lithium ion secondary battery, its battery properties were evaluated in the following manner. The results are shown in Table 5.

(Slurry Property: Dispersion Stability)

Five test samples were prepared by the electrode slurry was placed in each of test tubes having a diameter of 1 cm to a height (depth) of 5 cm. The test samples were vertically placed on a desk. The state of the placed slurry was observed for 7 days, and judgment was made in accordance with the following criteria. Small degree of sedimentation or coagulation is indicative of high dispersion stability.

A: No sedimentation or coagulation was found even after 7 days.
B: Sedimentation or coagulation was found after 5 to 6 days.
C: Sedimentation or coagulation was found after 1 to 2 days.
D: Sedimentation or coagulation was found after 12 hours or later and not after 24 hours.
E: Sedimentation or coagulation was found no later than 12 hours.

The time and the number of days until sedimentation occurred in each of the 5 samples (referred to as average required sedimentation time (days)) were determined, and the average required sedimentation time (days) was determined. The average required sedimentation time (days) was used as the day on which the sedimentation was found.

(Surface State of Electrode Plate)

The surfaces of produced electrode material layers were visually observed, and judgment was made as follows.

Coating Surface State-1 (Evaluation of Coating Streaks)

The electrode plate obtained in each of Examples and Comparative Examples was cut at arbitrary chosen positions into five pieces having a size of 5 cm wide and 20 cm long, and the number of coating streaks on the surface of the electrode material layer was visually checked. A continuous coating streak having a width of 1 mm or larger and a length of 1 mm or longer was determined as a coating streak. This operation was performed on all the five cut pieces to count the number of coating streaks formed on each of the five pieces.

Coating Surface State-2 (Evaluation of Pinholes)

The electrode plate obtained in each of the Examples and Comparative Examples was cut at arbitrary chosen positions into five pieces having size of 5 cm wide×20 cm long=100 $cm^2$, and the number of pinholes on the surface of the electrode material layer was visually checked. A pinhole having a diameter of 1 mm or larger was determined as a defect and counted as one pinhole.

This operation was performed on all the five cut pieces.

Coating Surface State (Comprehensive Evaluation)

Comprehensive evaluation was performed using classification criteria shown in Table 1, and the evaluation was made in five grades A to E.

TABLE 1

[evaluation criteria for electrode plate surface state]

| <Coating surface state (comprehensive evaluation)> | | Pinhole (number of defects having φ 1 mm or larger/100 $cm^2$) | | |
|---|---|---|---|---|
| | | 5 or less | 6-10 | More than 10 |
| Coating streaks (continuous streaks having a width of 1 mm or larger, length of 1 mm or longer/100 $cm^2$) | 0 line | A | B | C |
| | 1 line | B | C | D |
| | 2 lines or more | C | D | E |

(Peel Strength) <Positive Electrode>

An electrode having an electrode material layer formed thereon was cut into a rectangular shape of 2.5 cm wide×10 cm long to thereby prepare a test piece, and the test piece was secured with the surface of the electrode material layer facing upward. A cellophane tape was affixed to the surface of the electrode material layer of the test piece, and stress when the cellophane tape was peeled from one end of the test piece at a rate of 50 mm/min in a 180° direction was measured. The measurement was performed 10 times, and the average of the measurements was determined and taken as a peel strength (N/m). This was used as a basis for the evaluation of peel strength, and the evaluation was made in accordance with the following criteria. Large value of the peel strength is indicative of good adhesion between the electrode material layer and the current collector.

A: 15 N/m or larger
B: 10 N/m or larger and smaller than 15 N/m
C: 5.0 N/m or larger and smaller than to 10 N/m
D: 3.0 N/m or larger and smaller than 5.0 N/m
E: smaller than 3.0 N/m (Charging/Discharging Cycle Property (60° C.): Life Test)

Each of 10 coin-type cell batteries was charged by a constant current method at 0.2 C in an atmosphere of 60° C. to 4.3 V and then discharged to 3.0 V. This charging/discharging was repeated to measure an electric capacity. The average value for the 10 cells was used as the measurement value. A charging/discharging capacity retention ratio represented by the ratio (%) of the electric capacity after completion of 50 cycles relative to the electric capacity after completion of 5 cycles was determined and used as a basis for the evaluation of cycle property, and the evaluation was made in accordance with the following criteria. High value of the charging/discharging capacity retention is indicative of high high-temperature cycle property (battery life).

A: 80% or higher
B: 70% or higher and lower than 80%
C: 50% or higher and lower than 70%
D: 30% or higher and lower than 50%
E: lower than 30%

Example 2

A positive electrode plate and a: lithium ion secondary battery were produced and evaluated by the same procedure as in Example 1 except that a mixture obtained by mixing the varnish of the polymer A-2 and the varnish of the polymer B-1 such that (polymer A-2)/(polymer B-1)=4/6 (solid content weight ratio) was used as the binder solution. The results are shown in Table 5.

Example 3

A positive electrode plate and a lithium ion secondary battery were produced and evaluated by the same procedure as in Example 1 except that a mixture obtained by mixing the varnish of the polymer A-3 and the varnish of the polymer B-1 such that (polymer A-3)/(polymer B-1)=4/6 (solid content weight ratio) was used as the binder solution. The results are shown in Table 5.

Example 4

A positive electrode plate and a lithium ion secondary battery were produced and evaluated by the same procedure as in Example 1 except that a mixture obtained by mixing the varnish of the polymer A-1 and the varnish of the polymer B-2 such that (polymer A-1)/(polymer B-2)=4/6 (solid content weight ratio) was used as the binder solution. The results are shown in Table 5.

Example 5

A positive electrode plate and a lithium ion secondary battery were produced and evaluated by the same procedure as in Example 1 except that a Mixture obtained by mixing the varnish of the polymer A-1 and the varnish of the polymer B-3 such that (polymer A-1)/(polymer B-3)=4/6 (solid content weight ratio) was used as the binder solution. The results are shown in Table 5.

Example 6

A positive electrode plate and a lithium ion secondary battery were produced and evaluated by the same procedure as in Example 1 except that a mixture obtained by mixing the varnish of the polymer A-1 and the varnish of the polymer B-4 such that (polymer A-1)/(polymer B-4)=4/6 (solid content weight ratio) was used as the binder solution. The results are shown in Table 6.

Example 7

(Production of Negative Electrode Slurry)
Using a planetary mixer, 100 parts of artificial graphite having an average particle diameter of 35 μm and 1 part (in terms of solid content) of a binder solution were mixed. As the binder solution, a solution mixture obtained by mixing the varnish of the polymer A-1 and the varnish of the polymer B-1 such that (polymer A-1)/(polymer B-1)=4/6 (solid content weight ratio) was used. Then the mixture was mixed and dispersed for 1 hour. Then N-methylpyrrolidone was added in two portions, and the mixture was mixed for 10 minutes and subjected to defoaming under reduced pressure to thereby obtain a negative electrode slurry with a final solid content concentration of 75%.

(Production of Negative Electrode)
The aforementioned negative electrode slurry was applied onto the surface of a 20 nm-thick copper foil serving as a current collector to a dry thickness of about 200 μm using a die coater, dried at 60° C. for 20 minutes, and subjected to a heat treatment at 150° C. for 2 hours to thereby obtain a raw electrode plate. The raw electrode plate was rolled using a roll press to produce a negative electrode plate in which the density was controlled to 1.5 g/cm$^3$ and the total thickness of the copper foil and a negative electrode material layer was controlled to 80 μm. For removing the solvent remaining in the negative electrode plate and adsorbed water, a drying treatment was performed under reduced pressure at 120° C. for 12 hours.

(Production of Battery)
The obtained negative electrode plate was cut into a disc-shaped sheet having a diameter of 15 mm. A separator formed of a polypropylene-made disc-shaped porous film having a diameter of 18 mm and a thickness of 25 μm, metal lithium used as a counter electrode, and expanded metal were sequentially stacked on the surface of the negative electrode material layer of the negative electrode. Then a few drops of an electrolyte solution (a 1M solution of $LiPF_6$ in a mixture of (ethylene carbonate)/(diethyl carbonate)/(dimethyl carbonate)=1/1/1 (volume ratio)) were dropped thereon to the extent that the solution did not spill over. The resultant product was placed in a coin-shaped outer container made of stainless steel (diameter: 20 mm, height: 1.8 mm, thickness of stainless steel: 0.25 mm) equipped with a polypropylene packing.

Then a stainless steel cap having a thickness of 0.2 mm was put on and secured to the outer container through a polypropylene packing such that no air bubbles remained in the container. The resultant container was sealed using a caulking tool for producing a coin cell to thereby produce a lithium ion secondary battery having a diameter of 20 mm and a thickness of about 2 mm for evaluation of the negative electrode. The entirety of the aforementioned operation was performed in a glove box under an argon atmosphere. For the produced lithium ion secondary battery, the tests for the slurry property, the surface state of the electrode plate, and the charging/discharging cycle property (60° C.) test were performed in the same manner as in Example 1. The results are shown in Table The measurement of the peel strength of the negative electrode was performed in the following manner.

(Peel Strength) <Negative Electrode>
The electrode was cut into a rectangular shape of 2.5 cm wide×10 cm long to prepare a test piece, and the test piece was secured with the surface of the electrode active material (i.e., the surface of the electrode material layer) facing upward. A cellophane tape was affixed to the surface of the electrode active material layer of the test piece, and stress when the cellophane tape was peeled from one end of the test piece at a rate of 50 mm/min in a 180° direction was measured. The measurement was performed 10 times, and the average of the measurements was determined and taken as peel strength. Judgment was made in accordance with the following criteria. Strong peel strength is indicative of good adhesion of the electrode plate.

A: 6 N/m or larger
B: 5 N/m or larger and smaller than 6 N/m
C: 4 N/m or larger and smaller than 5 N/m
D: smaller than 4 N/m

Example 8

A positive electrode plate and a lithium ion secondary battery were produced and evaluated by the same procedure as in Example 1 except that a mixture obtained by mixing the varnish of the polymer A-1 and the varnish of the polymer B-1 such that (polymer A-1)/(polymer B-1)=5/5 (solid content weight ratio) was used as the binder solution. The results are shown in Table 6.

Example 9

A positive electrode plate and a lithium ion secondary battery were produced and evaluated by the same procedure as in Example 1 except that a mixture obtained by mixing the varnish Of the polymer A-1 and the varnish of the polymer B-1 such that (polymer A-1)/(polymer B-1)=3/7 (solid content weight ratio) was used as the binder solution. The results are shown in Table 6.

Example 10

A positive electrode plate and a lithium ion secondary battery were produced and evaluated by the same procedure as in Example 1 except that a mixture obtained by mixing the varnish of the polymer A-1 and the varnish of the polymer B-1 such that (polymer A-1)/(polymer B-1)=2/8 (solid content weight ratio) was used as the binder solution. The results are shown in Table 6.

Example 11

A positive electrode plate and a lithium ion secondary battery were produced and evaluated by the same procedure as in Example 1 except that only the varnish of the polymer A-1 was used as the binder solution in an amount in terms of solid content of 1 part with respect to 100 parts of the lithium-containing cobalt oxide-based electrode active material ("CELLSEED C-10N" manufactured by Nippon Chemical Industrial Co., Ltd.). The results are shown in Table 7.

Example 12

A positive electrode plate and a lithium ion secondary battery were produced and evaluated by the same procedure as in Example 1 except that a mixture obtained by mixing the varnish of the polymer A-4 and the varnish of the polymer B-1 such that (polymer A-4)/(polymer B-1)=4/6 (solid content weight ratio) was used as the binder solution. The results are shown in Table 7.

Example 13

A positive electrode plate and a lithium ion secondary battery were produced and evaluated by the same procedure as in Example 1 except that a mixture obtained by mixing the varnish of the polymer A-5 and the varnish of the polymer B-2 such that (polymer A-5)/(polymer B-2)=4/6 (solid content weight ratio) was used as the binder solution. The results are shown in Table 7.

Example 14

A positive electrode plate and a lithium ion secondary battery were produced and evaluated by the same procedure as in Example 1 except that a mixture obtained by mixing the varnish of the polymer A-6 and the varnish of the polymer B-6 such that (polymer A-6)/(polymer B-6)=4/6 (solid content weight ratio) was used as the binder solution. The results are shown in Table 7.

Example 15

A positive electrode plate and a lithium ion secondary battery were produced and evaluated by the same procedure as in Example 1 except that a mixture obtained by mixing the varnish of the polymer A-7 and the varnish of the polymer B-7 such that (polymer A-7)/(polymer B-7)=4/6 (solid content weight ratio) was used as the binder solution. The results are shown in Table 7.

Example 16

A positive electrode plate and a lithium ion secondary battery were produced and evaluated by the same procedure as in Example 1 except that the amount of the binder solution with respect to 100 parts of the positive electrode active material was changed to 0.4 parts (in terms of solid content). The results are shown in Table Example 17

A positive electrode plate and a lithium ion secondary battery were produced and evaluated by the same procedure as in Example 1 except that the amount of the binder solution with respect to 100 parts of the positive electrode active material was changed to 3.5 parts (in terms of solid content). The results are shown in Table 8.

Example 18

A positive electrode plate and a lithium ion secondary battery were produced and evaluated by the same procedure as in Example 1 except that a mixture obtained by mixing the varnish of the polymer A-1 and the varnish of the polymer B-1 such that (polymer A-1)/(polymer B-1)=6/4 (solid content weight ratio) was used as the binder solution. The results are shown in Table 8.

Example 19

A positive electrode plate and a lithium ion secondary battery were produced and evaluated by the same procedure as in Example 1 except that a mixture obtained by mixing the varnish of the polymer A-1 and the varnish of the polymer B-5 such that (polymer A-1)/(polymer B-5)=4/6 (solid content weight ratio) was used as the binder solution. The results are shown in Table 8.

Example 20

A positive electrode plate and a lithium ion secondary battery were produced and evaluated by the same procedure as in Example 1 except that a varnish of polyvinylidene fluoride (PVDF) (an NMP solution of "KF1120" manufactured by Kureha Corporation, resin content: 12% by weight) was used instead of the varnish of the polymer B-1 in the binder solution. The results are shown in Table 8.

Comparative Example 1

A positive electrode plate and a lithium ion secondary battery were produced and evaluated by the same procedure as in Example 1 except that a mixture obtained by mixing the varnish of the polymer A-8 and the varnish of the polymer B-1 such that (polymer A-8)/(polymer B-1)=4/6 (solid content weight ratio) was used as the binder solution. The results are shown in Table 9.

Comparative Example 2

A positive electrode plate and a lithium ion secondary battery were produced and evaluated by the same procedure as in Example 1 except that a mixture obtained by mixing the varnish of the polymer A-9 and the varnish of the polymer B-1 such that (polymer A-9)/(polymer B-1)=4/6 (solid content weight ratio) was used as the binder solution. The results are shown in Table 9.

Comparative Example 3

An attempt was made to use a varnish of the polymer produced in the manner in Synthesis Example A-10 for the binder solution. However, the polymer was not obtained, so that a positive electrode plate and a lithium ion secondary battery could not be produced.

Comparative Example 4

A positive electrode plate and a lithium ion secondary battery were produced and evaluated by the same procedure as in Example 1 except that a mixture obtained by mixing the varnish of the polymer A-11 and the varnish of the polymer B-1 such that (polymer A-11)/(polymer B-1)=4/6 (solid content weight ratio) was used as the binder solution. The results are shown in Table 9.

Comparative Example 5

A positive electrode plate and a lithium ion secondary battery were produced and evaluated by the same procedure as in Example 1 except that a mixture obtained by mixing the varnish of the polymer A-12 and the varnish of the polymer B-1 such that (polymer A-12)/(polymer B-1)=4/6 (solid content weight ratio) was used as the binder solution. The results are shown in Table 9.

TABLE 2

[Synthesis Examples A-1-A-6]

|  |  | Polymer A-1 | Polymer A-2 | Polymer A-3 | Polymer A-4 | Polymer A-5 | Polymer A-6 |
|---|---|---|---|---|---|---|---|
| Nitrile group-containing monomer (wt parts) | Acrylonitrile | 95 | 95 | 98 | — | 85 | 90 |
|  | Methacrylonitrile | — | — | — | 99.5 | — | 5 |
| Ethylenically unsaturated compound (wt parts) | Methacrylic acid | 5 | — | 2 | — | 10 | — |
|  | Acrylic acid | — | 5 | — | 0.5 | 5 | — |
|  | Maleic acid | — | — | — | — | — | 4 |
|  | Itaconic acid | — | — | — | — | — | 1 |
|  | 2-ethyl hexyl acrylate | — | — | — | — | — | — |
| Polymerzation initiator | Oil-soluble | OTAZO-15 (0.4 parts) | OTAZO-15 (0.4 parts) | OTAZO-15 (0.6 parts) | AIBN (0.2 parts) | V-601 (0.3 parts) | OTAZO-15 (0.45 parts) |
|  | Water-soluble | — | — | — | — | — | — |
| Partially saponified polyvinyl alcohol (wt parts) |  | 0.2 | 0.2 | 0.4 | 0.3 | 0.3 | 0.6 |
| Yield/scale of status |  | 70%/A | 65%/A | 72%/B | 65%/B | 65%/B | 60%/B |
| Nitrile group-containing monomer unit (wt %) |  | 95 | 95 | 98 | 99.5 | 85 | 95 |
| Ethylenically unsaturated compound unit (wt %) |  | 5 | 5 | 2 | 0.5 | 15 | 5 |
| Mw |  | 1,300,000 | 1,600,000 | 700,000 | 1,000,000 | 1,800,000 | 800,000 |
| Mw/Mn |  | 8 | 10.5 | 5 | 7 | 10 | 9 |

TABLE 3

[Synthesis Examples A-7-A-12]

|  |  | Polymer A-7 | Polymer A-8 | Polymer A-9 | Polymer A-10 | Polymer A-11 | Polymer A-12 |
|---|---|---|---|---|---|---|---|
| Nitrile group-containing monomer (wt parts) | Acrylonitrile | 90 | 100 | 96 | 75 | 90 | 95 |
|  | Methacrylonitrile | — | — | — | — | — | — |
| Ethylenically unsaturated | Methacrylic acid | 5 | — | 4 | 10 | 5 | — |

TABLE 3-continued

[Synthesis Examples A-7–A-12]

|  |  | Polymer A-7 | Polymer A-8 | Polymer A-9 | Polymer A-10 | Polymer A-11 | Polymer A-12 |
|---|---|---|---|---|---|---|---|
| compound (wt parts) | Acrylic acid | — | — | — | 15 | 5 | 5 |
|  | Maleic acid | — | — | — | — | — | — |
|  | Itaconic acid | — | — | — | — | — | — |
|  | 2-ethylhexyl acrylate | 5 | — | — | — | — | — |
| Polymerzation initiator | Oil-soluble | OTAZO-15 (0.5 parts) | OTAZO-15 (0.4 parts) | — | V-601 (0.3 parts) | — | OTAZO-15 (0.2 parts) |
|  | Water-soluble | — | — | APS (0.5 parts) | — | APS (0.5 parts) | — |
| Partially saponified polyvinyl alcohol (wt parts) |  | 0.6 | 0.2 | 0.2 | 0.2 | 0.2 | 0.4 |
| Yield/scale of status |  | 63%/B | 70%/A | 72%/A | ** | 74%/A | 52%/C |
| Nitrile group-containing monomer unit (wt %) |  | 90 | 100 | 96 |  | 90 | 95 |
| Ethylenically unsaturated compound unit (wt %) |  | 10 | — | 4 | 25 | 10 | 5 |
| Mw |  | 1,100,000 | 1,000,000 | 450,000 | ** | 700,000 | 2,500,000 |
| Mw/Mn |  | 8 | 10 | 8 |  | 14 | 14 |

** Coagulation was occurred during polymerization reaction, and polymer particles were not obtainable.

TABLE 4

[Synthesis Examples B-1–B-8]

|  |  | Polymer B-1 | Polymer B-2 | Polymer B-3 | Polymer B-4 | Polymer B-5 | Polymer B-6 | Polymer B-7 |
|---|---|---|---|---|---|---|---|---|
| Acrylonitrile (wt parts) |  | 15 | 35 | — | 8 | 45 | 45 | — |
| Methacrylonitrile (wt parts) |  | — | — | 20 | — | — | — | 5 |
| Ethylenically unsaturated compound (wt parts) | 2-ethylhexyl acrylate | 80 | — | — | 87 | 50 | 52 | 85 |
|  | 1,3-butadiene | — | 65 | 75 | — | — | — | — |
|  | Maleic acid | 5 | — | 5 | 5 | — | 3 | 10 |
|  | Methacrylic acid |  |  |  |  | 5 |  |  |
| Amount of (meth)acrylonitrile unit (wt parts) |  | 15 | 35 | 20 | 8 | 45 | 45 | 5 |
| Iodine number (g/100 g) |  | Less than 1 | 5 | 20 | Less than 1 | Less than 1 | Less than 1 | Less than 1 |
| Glass transition temperature (° C.) |  | −39 | −30 | −35 | −50 | +6 | +0.5 | −45 |
| Amount of ethylenically unsaturated compound unit (wt parts) |  | 85 | 65 | 80 | 92 | 50 | 55 | 95 |

TABLE 5

[Results of Examples 1-5]

| | | | Ex. 1 | Ex. 2 | Ex. 3 | Ex. 4 | Ex. 5 |
|---|---|---|---|---|---|---|---|
| Polymer A | Type | | Polymer A-1 | Polymer A-2 | Polymer A-3 | Polymer A-1 | Polymer A-1 |
| | Nitrile group-containing monomer (wt parts) | Acrylonitrile | 95 | 95 | 98 | 95 | 95 |
| | | Methacrylonitrile | — | — | — | — | — |
| | Ethylenically unsaturated compound (wt parts) | Methacrylic acid | 5 | — | 2 | 5 | 5 |
| | | Acrylic acid | — | 5 | — | — | — |
| | | Maleic acid | — | — | — | — | — |
| | | Itaconic acid | — | — | — | — | — |
| | | 2-ethylhexyl acrylate | — | — | — | — | — |
| | Polymerzation initiator | Oil-soluble | OTAZO-15 (0.4 parts) | OTAZO-15 (0.4 parts) | OTAZO-15 (0.6 parts) | OTAZO-15 (0.4 parts) | OTAZO-15 (0.4 parts) |
| | | Water-soluble | — | — | — | — | — |
| | Partially saponified polyvinyl alcohol (wt parts) | | 0.2 | 0.2 | 0.4 | 0.2 | 0.2 |
| | Yield/scale of status | | 70%/A | 65%/A | 72%/B | 70%/A | 70%/A |
| | Nitrile group-containing monomer unit (wt %) | | 95 | 95 | 98 | 95 | 95 |
| | Ethylenically unsaturated compound unit (wt %) | | 5 | 5 | 2 | 5 | 5 |
| | Mw | | 1,300,000 | 1,600,000 | 700,000 | 1,300,000 | 1,300,000 |
| | Mw/Mn | | 8 | 10.5 | 5 | 8 | 8 |
| Polymer A/Polymer B (wt ratio) | | | 4/6 | 4/6 | 4/6 | 4/6 | 4/6 |
| Polymer B | Type | | Polymer B-1 | Polymer B-1 | Polymer B-1 | Polymer B-2 | Polymer B-3 |
| | Acrylonitrile (wt parts) | | 15 | 15 | 15 | 35 | — |
| | Methacrylonitrile (wt parts) | | — | — | — | — | 20 |
| | Ethylenically unsaturated compound (wt parts) | 2-ethylhexyl acrylate | 80 | 80 | 80 | — | — |
| | | Butadiene | — | — | — | 65 | 75 |
| | | Maleic acid | 5 | 5 | 5 | — | 5 |
| | Amount of (meth)acrylonitrile unit (wt parts) | | 15 | 15 | 15 | 35 | 20 |
| | Iodine number(g/100 g) | | Less than 1 | Less than 1 | Less than 1 | 5 | 20 |
| | Glass transition temperature (°C.) | | −39 | −39 | −39 | −30 | −35 |
| | Amount of ethylenically unsaturated compound unit (wt parts) | | 85 | 85 | 85 | 65 | 80 |
| Electrode | | | Positive | Positive | Positive | Positive | Positive |
| Total amount of polymer A and polymer B (wt parts) | | | 1 | 1 | 1 | 1 | 1 |
| Slurry property | | | A | A | A | A | A |
| Surface state of electrode plate | | | A | A | A | A | A |
| Peel strength | | | A | B | B | B | A |
| Charging/discharging cycle property | | | A | A | A | B | C |

TABLE 6

[Results of Examples 6-10]

| | | | Ex. 6 | Ex. 7 | Ex. 8 | Ex. 9 | Ex. 10 |
|---|---|---|---|---|---|---|---|
| Polymer A | Type | | Polymer A-1 | Polymer A-1 | Polymer A-1 | Polymer A-1 | Polymer A-1 |
| | Nitrile group-containing monomer (wt parts) | Acrylonitrile | 95 | 95 | 95 | 95 | 95 |
| | | Methacrylonitrile | — | — | — | — | — |
| | Ethylenically unsaturated compound (wt parts) | Methacrylic acid | 5 | 5 | 5 | 5 | 5 |
| | | Acrylic acid | — | — | — | — | — |
| | | Maleic acid | — | — | — | — | — |
| | | Itaconic acid | — | — | — | — | — |
| | | 2-ethylhexyl acrylate | — | — | — | — | — |

TABLE 6-continued

[Results of Examples 6-10]

|  |  |  | Ex. 6 | Ex. 7 | Ex. 8 | Ex. 9 | Ex. 10 |
|---|---|---|---|---|---|---|---|
|  | Polymerzation initiator | Oil-soluble | OTAZO-15 (0.4 parts) | OTAZO-15 (0.4 parts) | OTAZO-15 (0.4 parts) | OTAZO-15 (0.4 parts) | OTAZO-15 (0.4 parts) |
|  |  | Water-soluble | — | — | — | — | — |
|  | Partially saponified polyvinyl alcohol (wt parts) |  | 0.2 | 0.2 | 0.2 | 0.2 | 0.2 |
|  | Yield/scale of status |  | 70%/A | 70%/A | 70%/A | 70%/A | 70%/A |
|  | Nitrile group-containing monomer unit (wt %) |  | 95 | 95 | 95 | 95 | 95 |
|  | Ethylenically unsaturated compound unit (wt %) |  | 5 | 5 | 5 | 5 | 5 |
|  | Mw |  | 1,300,000 | 1,300,000 | 1,300,000 | 1,300,000 | 1,300,000 |
|  | Mw/Mn |  | 8 | 8 | 8 | 8 | 8 |
| Polymer A/Polymer B (wt ratio) |  |  | 4/6 | 4/6 | 5/5 | 3/7 | 2/8 |
| Polymer B | Type |  | Polymer B-4 | Polymer B-1 | Polymer B-1 | Polymer B-1 | Polymer B-1 |
|  | Acrylonitrile (wt parts) |  | 8 | 15 | 15 | 15 | 15 |
|  | Methacrylonitrile (wt parts) |  | — | — | — | — | — |
|  | Ethylenically unsaturated compound (wt parts) | 2-ethylhexyl acrylate | 87 | 80 | 80 | 80 | 80 |
|  |  | Butadiene | — | — | — | — | — |
|  |  | Maleic acid | 5 | 5 | 5 | 5 | 5 |
|  |  | Methacrylic acid | — | — | — | — | — |
|  | Amount of (meth)acrylonitrile unit (wt parts) |  | 8 | 15 | 15 | 15 | 15 |
|  | Iodine number (g/100 g) |  | Less than 1 | Less than 1 | Less than 1 | Less than 1 | Less than 1 |
|  | Glass transition temperature (° C.) |  | −50 | −39 | −39 | −39 | −39 |
|  | Amount of ethylenically unsaturated compound unit (wt parts) |  | 92 | 85 | 85 | 85 | 85 |
| Electrode |  |  | Positive | Negative | Positive | Positive | Positive |
| Total amount of polymer A and polymer B (wt parts) |  |  | 1 | 1 | 1 | 1 | 1 |
| Slurry property |  |  | A | A | B | B | B |
| Surface state of electrode plate |  |  | A | A | A | B | B |
| Peel strength |  |  | A | A | A | B | C |
| Charging/discharging cycle property |  |  | B | A | B | B | C |

TABLE 7

[Results of Examples 11-15]

|  |  |  | Ex. 11 | Ex. 12 | Ex. 13 | Ex. 14 | Ex. 15 |
|---|---|---|---|---|---|---|---|
| Polymer A | Type |  | Polymer A-1 | Polymer A-4 | Polymer A-5 | Polymer A-6 | Polymer A-7 |
|  | Nitrile group-containing monomer (wt parts) | Acrylonitrile | 95 | — | 85 | 90 | 90 |
|  |  | Methacrylonitrile | — | 99.5 | — | 5 | — |
|  | Ethylenically unsaturated compound (wt parts) | Methacrylic acid | 5 | — | 10 | — | 5 |
|  |  | Acrylic acid | — | 0.5 | 5 | — | — |
|  |  | Maleic acid | — | — | — | 4 | — |
|  |  | Itaconic acid | — | — | — | 1 | — |
|  |  | 2-ethylhexyl acrylate | — | — | — | — | 5 |
|  | Polymerzation initiator | Oil-soluble | OTAZO-15 (0.4 parts) | AIBN (0.2 parts) | V-601 (0.3 parts) | OTAZO-15 (0.45 parts) | OTAZO-15 (0.5 parts) |
|  |  | Water-soluble | — | — | — | — | — |
|  | Partially saponified polyvinyl alcohol (wt parts) |  | 0.2 | 0.3 | 0.3 | 0.6 | 0.6 |
|  | Yield/scale of status |  | 70%/A | 65%/B | 65%/B | 60%/B | 63%/B |
|  | Nitrile group-containing monomer unit (wt %) |  | 95 | 99.5 | 85 | 95 | 90 |
|  | Ethylenically unsaturated compound unit (wt %) |  | 5 | 0.5 | 15 | 5 | 10 |
|  | Mw |  | 1,300,000 | 1,000,000 | 1,800,000 | 800,000 | 1,100,000 |
|  | Mw/Mn |  | 8 | 7 | 10 | 9 | 8 |

TABLE 7-continued

[Results of Examples 11-15]

| | | | Ex. 11 | Ex. 12 | Ex. 13 | Ex. 14 | Ex. 15 |
|---|---|---|---|---|---|---|---|
| Polymer A/Polymer B (wt ratio) | | | 10/0 | 4/6 | 4/6 | 4/6 | 4/6 |
| Polymer B | Type | | None | Polymer B-1 | Polymer B-2 | Polymer B-6 | Polymer B-7 |
| | Acrylonitrile (wt parts) | | — | 15 | 35 | 45 | — |
| | Methacrylonitrile (wt parts) | | — | — | — | — | 5 |
| | Ethylenically unsaturated compound (wt parts) | 2-ethylhexyl acrylate | — | 80 | — | 52 | 85 |
| | | Butadiene | — | — | 65 | — | — |
| | | Maleic acid | — | 5 | — | 3 | 10 |
| | | Methacrylic acid | — | — | — | — | — |
| | Amount of (meth)acrylonitrile unit (wt parts) | | — | 15 | 35 | 45 | 5 |
| | Iodine number (g/100 g) | | — | Less than 1 | 5 | Less than 1 | Less than 1 |
| | Glass transition temperature (° C.) | | — | −39 | −30 | +0.5 | −45 |
| | Amount of ethylenically unsaturated compound unit (wt parts) | | — | 85 | 65 | 55 | 95 |
| Electrode | | | Positive | Positive | Positive | Positive | Positive |
| Total amount of polymer A and polymer B (wt parts) | | | 1 | 1 | 1 | 1 | 1 |
| Slurry property | | | B | B | A | A | B |
| Surface state of electrode plate | | | B | B | A | B | B |
| Peel strength | | | C | A | B | C | B |
| Charging/discharging cycle property | | | C | B | B | C | C |

TABLE 8

[Results of Examples 16-20]

| | | | Ex. 16 | Ex. 17 | Ex. 18 | Ex. 19 | Ex. 20 |
|---|---|---|---|---|---|---|---|
| Polymer A | Type | | Polymer A-1 | Polymer A-1 | Polymer A-1 | Polymer A-1 | Polymer A-1 |
| | Nitrile group-containing monomer (wt parts) | Acrylonitrile | 95 | 95 | 95 | 95 | 95 |
| | | Methacrylonitrile | — | — | — | — | — |
| | Ethylenically unsaturated compound (wt parts) | Methacrylic acid | 5 | 5 | 5 | 5 | 5 |
| | | Acrylic acid | — | — | — | — | — |
| | | Maleic acid | — | — | — | — | — |
| | | Itaconic acid | — | — | — | — | — |
| | | 2-ethylhexyl acrylate | — | — | — | — | — |
| | Polymerzation initiator | Oil-soluble | OTAZO-15 (0.4 parts) | OTAZO-15 (0.4 parts) | OTAZO-15 (0.4 parts) | OTAZO-15 (0.4 parts) | OTAZO-15 (0.4 parts) |
| | | Water-soluble | — | — | — | — | — |
| | Partially saponified polyvinyl alcohol (wt parts) | | 0.2 | 0.2 | 0.2 | 0.2 | 0.2 |
| | Yield/scale of status | | 70%/A | 70%/A | 70%/A | 70%/A | 70%/A |
| | Nitrile group-containing monomer unit (wt %) | | 95 | 95 | 95 | 95 | 95 |
| | Ethylenically unsaturated compound unit (wt %) | | 5 | 5 | 5 | 5 | 5 |
| | Mw | | 1,300,000 | 1,300,000 | 1,300,000 | 1,300,000 | 1,300,000 |
| | Mw/Mn | | 8 | 8 | 8 | 8 | 8 |
| Polymer A/Polymer B (wt ratio) | | | 4/6 | 4/6 | 6/4 | 4/6 | 4/6 |
| Polymer B | Type | | Polymer B-1 | Polymer B-1 | Polymer B-1 | Polymer B-5 | PVDF |
| | Acrylonitrile (wt parts) | | 15 | 15 | 15 | 45 | — |
| | Methacrylonitrile (wt parts) | | — | — | — | — | — |
| | Ethylenically unsaturated compound (wt parts) | 2-ethylhexyl acrylate | 80 | 80 | 80 | 50 | — |
| | | Butadiene | — | — | — | — | — |
| | | Maleic acid | 5 | 5 | 5 | — | — |
| | | Methacrylic acid | — | — | — | 5 | — |
| | Amount of (meth)acrylonitrile unit (wt parts) | | 15 | 15 | 15 | 45 | — |

TABLE 8-continued

[Results of Examples 16-20]

|  |  | Ex. 16 | Ex. 17 | Ex. 18 | Ex. 19 | Ex. 20 |
|---|---|---|---|---|---|---|
|  | Iodine number (g/100 g) | Less than 1 | Less than 1 | Less than 1 | Less than 1 | — |
|  | Glass transition temperature (° C.) | −39 | −39 | −39 | +6 | — |
|  | Amount of ethylenically unsaturated compound unit (wt parts) | 85 | 85 | 85 | 50 | — |
| Electrode |  | Positive | Positive | Positive | Positive | Positive |
| Total amount of polymer A and polymer B (wt parts) |  | 0.4 | 3.5 | 1 | 1 | 1 |
| Slurry property |  | B | B | B | B | C |
| Surface state of electrode plate |  | B | B | B | B | B |
| Peel strength |  | C | B | B | C | C |
| Charging/discharging cycle property |  | C | B | C | C | C |

TABLE 9

[Results of Comparative Examples 1-5]

|  |  |  | Comp. Ex. 1 | Comp. Ex. 2 | Comp. Ex. 3 | Comp. Ex. 4 | Comp. Ex. 5 |
|---|---|---|---|---|---|---|---|
| Polymer A | Type |  | Polymer A-8 | Polymer A-9 | Polymer A-10 | Polymer A-11 | Polymer A-12 |
|  | Nitrile group-containing monomer (wt parts) | Acrylonitrile | 100 | 96 | 75 | 90 | 95 |
|  |  | Methacrylonitrile | — | — | — | — | — |
|  | Ethylenically unsaturated compound (weigh parts) | Methacrylic acid | — | 4 | 10 | 5 | — |
|  |  | Acrylic acid | — | — | 15 | 5 | 5 |
|  |  | Maleic acid | — | — | — | — | — |
|  |  | Itaconic acid | — | — | — | — | — |
|  |  | 2-ethylhexyl acrylate | — | — | — | — | — |
|  | Polymerzation initiator | Oil-soluble | OTAZO-15 (0.4 parts) | — | V-601 (0.3 parts) | — | OTAZO-15 (0.2 parts) |
|  |  | Water-soluble | — | APS (0.5 parts) | — | APS (0.5 parts) | — |
|  | Partially saponified polyvinyl alcohol (wt parts) |  | 0.2 | 0.2 | 0.2 | 0.2 | 0.4 |
|  | Yield/scale of status |  | 70%/A | 72%/A | ** | 74%/A | 52%/C |
|  | Nitrile group-containing monomer unit (wt %) |  | 100 | 96 | — | 90 | 95 |
|  | Ethylenically unsaturated compound unit (wt %) |  | — | 4 | 25 | 10 | 5 |
|  | Mw |  | 1,000,000 | 450,000 | ** | 700,000 | 2,500,000 |
|  | Mw/Mn |  | 10 | 8 |  | 14 | 14 |
| Polymer A/Polymer B (wt ratio) |  |  | 4/6 | 4/6 | 4/6 | 4/6 | 4/6 |
| Polymer B | Type |  | Polymer B-1 | Polymer B-1 | — | Polymer B-1 | Polymer B-1 |
|  | Acrylonitrile (parts) |  | 15 | 15 | — | 15 | 15 |
|  | Methacrylonitrile (parts) |  | — | — | — | — | — |
|  | Ethylenically unsaturated compound (wt parts) | 2-ethylhexyl acrylate | 80 | 80 | — | 80 | 80 |
|  |  | Butadiene | — | — | — | — | — |
|  |  | Maleic acid | 5 | 5 | — | 5 | 5 |
|  |  | Methacrylic acid | — | — | — | — | — |
|  | Amount of (meth)acrylonitrile unit (wt parts) |  | 15 | 15 | — | 15 | 15 |
|  | Iodine number (g/100 g) |  | Less than 1 | Less than 1 | — | Less than 1 | Less than 1 |
|  | Glass transition temperature (° C.) |  | −39 | −39 | — | −39 | −39 |
|  | Amount of ethylenically unsaturated compound unit (wt parts) |  | 85 | 85 | — | 85 | 85 |
| Electrode |  |  | Positive | Positive | — | Positive | Positive |
| Total amount of polymer A and polymer B (wt parts) |  |  | 1 | 1 | — | 1 | 1 |
| Slurry property |  |  | C | B | — | C | C |
| Surface state of electrode plate |  |  | B | B | — | C | D |

TABLE 9-continued

[Results of Comparative Examples 1-5]

| | Comp. Ex. 1 | Comp. Ex. 2 | Comp. Ex. 3 | Comp. Ex. 4 | Comp. Ex. 5 |
|---|---|---|---|---|---|
| Peel strength | C | D | — | E | E |
| Charging/discharging cycle property | D | E | — | E | E |

** Coagulation was occurred during polymerization reaction, and polymer particles were not obtainable.

DISCUSSION

As can be seen from Tables 2 to 9, it was found out that, in Examples using the binder compositions of the present invention, high stability of the electrode slurries was achieved and the cycle properties of the batteries were able to be improved.

The invention claimed is:

1. A binder composition for an electrode of a non-aqueous electrolyte battery, the binder composition comprising a polymer A containing 80% by weight or more and 99.9% by weight or less of a repeating unit derived from a monomer including a nitrile group and 0.1% by weight or more and 20% by weight or less of a repeating unit derived from an ethylenically unsaturated compound, wherein
   a weight-average molecular weight of the polymer A is 500,000 to 2,000,000,
   a molecular weight distribution (Mw/Mn) of the polymer A is 13 or smaller,
   the binder composition further comprises a polymer B containing 10% by weight or more and 40% by weight or less of a repeating unit derived from acrylonitrile or methacrylonitrile, and
   the polymer B has an iodine number of 50 g/100 g or lower.

2. The binder composition for an electrode of a non-aqueous electrolyte battery according to claim 1, wherein a weight ratio of the polymer A to the polymer B (the polymer A/the polymer B) is 3/7 or higher and 7/3 or lower.

3. An electrode for a non-aqueous electrolyte battery, comprising a current collector and an electrode material layer provided on at least one side of the current collector, wherein
   the electrode material layer contains an electrode active material and the binder composition for an electrode according to claim 1, and
   a solid content of the binder composition for the electrode with respect to 100 parts by weight of the electrode active material is 0.3 parts by weight or more and 5 parts by weight or less.

4. A non-aqueous electrolyte battery comprising the electrode for a non-aqueous electrolyte battery according to claim 3.

5. The non-aqueous electrolyte battery according to claim 4, wherein the non-aqueous electrolyte battery is a lithium ion secondary battery.

6. An electrode for a non-aqueous electrolyte battery, comprising a current collector and an electrode material layer provided on at least one side of the current collector, wherein
   the electrode material layer contains an electrode active material and the binder composition for an electrode according to claim 2, and
   a solid content of the binder composition for the electrode with respect to 100 parts by weight of the electrode active material is 0.3 parts by weight or more and 5 parts by weight or less.

7. A non-aqueous electrolyte battery comprising the electrode for a non-aqueous electrolyte battery according to claim 6.

8. The non-aqueous electrolyte battery according to claim 7, wherein the non-aqueous electrolyte battery is a lithium ion secondary battery.

9. The binder composition for an electrode of a non-aqueous electrolyte battery according to claim 1, wherein the binder composition is for a positive electrode.

* * * * *